US011325054B2

(12) United States Patent
Raviv et al.

(10) Patent No.: US 11,325,054 B2
(45) Date of Patent: May 10, 2022

(54) DEVICES, SYSTEMS AND METHODS FOR AUTOMATIC EXTRACTION, STORAGE AND ENCAPSULATION OF FATTY COMPOUNDS

(71) Applicant: ELTIVU TECHNOLOGIES LTD., Rosh Haayin (IL)

(72) Inventors: Alon Raviv, Rosh Haayin (IL); Ido Maslaton, Tel Aviv (IL)

(73) Assignee: ELTIVU TECHNOLOGIES LTD, Rosh Haayin (IL)

( * ) Notice: Subject to any disclaimer, the term of this patent is extended or adjusted under 35 U.S.C. 154(b) by 0 days.

(21) Appl. No.: 17/464,752

(22) Filed: Sep. 2, 2021

(65) Prior Publication Data

US 2022/0001298 A1 Jan. 6, 2022

Related U.S. Application Data

(63) Continuation of application No. PCT/IL2020/050290, filed on Mar. 12, 2020.

(51) Int. Cl.
*B01D 11/02* (2006.01)
*B01J 19/00* (2006.01)
*C11B 1/10* (2006.01)

(52) U.S. Cl.
CPC ...... *B01D 11/0207* (2013.01); *B01D 11/0219* (2013.01); *B01D 11/0288* (2013.01);
(Continued)

(58) Field of Classification Search
CPC ..... B01D 11/00; B01D 11/02; B01D 11/0207; B01D 11/0215; B01D 11/0219;
(Continued)

(56) References Cited

U.S. PATENT DOCUMENTS 6,860,998 B1 3/2005 Wilde
9,272,230 B2 3/2016 Myers
(Continued)

FOREIGN PATENT DOCUMENTS

EP 1503712 2/2005
EP 1326598 8/2005
(Continued)

OTHER PUBLICATIONS

International Search Report tor PCT Application No. PCT/IL2020/050290, dated Jul. 2, 2020.

*Primary Examiner* — Natasha E Young
(74) *Attorney, Agent, or Firm* — Pearl Cohen Zedek Latzer Baratz LLP

(57) ABSTRACT

A device for automatic extraction, storage and encapsulation of fatty compounds, the device may include: an extraction unit configured to provide a liquid mixture comprising fatty compounds extracted from biological material and a liquid solvent; an evaporation and reaction unit; a storage unit comprising one or more storage outlet ports; and a controller configured to: control delivery of the liquid mixture from the extraction unit to the evaporation and reaction unit; control evaporation of the solvent from the liquid mixture in the evaporation and reaction unit; control delivery of the liquid mixture from the evaporation and reaction unit to the storage unit; detect safe connection of each of at least one of one or more capsules to one of the one or more storage outlet ports of the storage unit; and control filling of at least one of the one or more connected capsules with the liquid mixture.

18 Claims, 25 Drawing Sheets

(52) U.S. Cl.
CPC ......... *B01D 11/0296* (2013.01); *B01J 19/002* (2013.01); *B01J 19/0013* (2013.01); *C11B 1/10* (2013.01); *B01J 2219/00191* (2013.01); *B01J 2219/00265* (2013.01)

(58) Field of Classification Search
CPC ............ B01D 11/0288; B01D 11/0292; B01D 11/0296; B01J 19/00; B01J 19/0006; B01J 19/0013; B01J 19/002; B01J 2219/00; B01J 2219/00049; B01J 2219/00191; B01J 2219/0245; B01J 2219/00259; B01J 2219/00265; C11B 1/00; C11B 1/10
See application file for complete search history.

(56) References Cited

U.S. PATENT DOCUMENTS

| | | |
|---|---|---|
| 9,327,210 B1 | 5/2016 | Jones |
| 9,604,155 B2 | 3/2017 | McGhee |
| 9,649,575 B2 | 5/2017 | Hopkins et al. |
| 9,757,664 B2 | 9/2017 | McGhee |
| 2017/0312327 A1 | 11/2017 | Jones |
| 2018/0099017 A1 | 4/2018 | Jones |

FOREIGN PATENT DOCUMENTS

| | | |
|---|---|---|
| EP | 1547570 | 5/2013 |
| EP | 3197418 | 8/2017 |
| WO | WO 2016/205923 | 12/2016 |
| WO | WO 2018/215520 A1 | 11/2018 |

DEVICES, SYSTEMS AND METHODS FOR AUTOMATIC EXTRACTION, STORAGE AND ENCAPSULATION OF FATTY COMPOUNDS

CROSS-REFERENCE TO RELATED APPLICATIONS

This application is a continuation of PCT International Application No. PCT/IL2020/050290, International Filing Date Mar. 12, 2020, published as WO/2020/183468 on Sep. 17, 2020, claiming the benefit of Israeli Patent Application No. 265353, filed Mar. 13, 2019, which are hereby incorporated by reference.

FIELD OF THE INVENTION

The present invention relates to the field of extraction of fatty compounds, and more particularly, to automatic devices, systems and for methods for extraction, storage and encapsulation of fatty compounds.

BACKGROUND OF THE INVENTION

Fatty compounds are widely used, for example, in the food industry, pharmaceutical industry, cosmetics industry and the like. Currently there is a trend of extracting fatty compounds for personal use, for example for the treatment of medical and psychological disorders, health nutrition, preparation of natural cosmetic products and the like.

SUMMARY OF THE INVENTION

Some embodiments may provide a device for automatic extraction, storage and encapsulation of fatty compounds, the device may include: an extraction unit configured to provide a liquid mixture comprising fatty compounds extracted from biological material and a liquid solvent; an evaporation and reaction unit; a storage unit that may include one or more storage outlet ports; fluid conduits connecting the evaporation and reaction unit with the extraction unit and the storage unit with the evaporation and reaction unit; and a controller configured to: control delivery of the liquid mixture from the extraction unit to the evaporation and reaction unit; control evaporation of the solvent from the liquid mixture in the evaporation and reaction unit; control delivery of the liquid mixture from the evaporation and reaction unit to the storage unit; detect safe connection of each of at least one of one or more capsules to one of the one or more storage outlet ports of the storage unit; and control filling of at least one of the one or more connected capsules with the liquid mixture from the storage unit.

In some embodiments, the device may include: a solvent supply unit; and fluid conduits connecting the solvent supply unit with the extraction unit; wherein the controller is configured to control delivery of the liquid solvent from the solvent supply unit to the extraction unit.

In some embodiments, the device may include a diluting liquid supply unit; and fluid conduits connecting the diluting liquid supply unit with the evaporation and reaction unit; wherein the controller is configured to control delivery of a diluting liquid from the diluting liquid supply unit to the evaporation and reaction unit.

In some embodiments, the controller is configured to: receive user's preferences concerning the liquid mixture to be produced; determine operation parameters based on the user's preferences; and control the delivery, the evaporation and the filling based on the determined operation parameters.

In some embodiments, the extraction unit may include: a filter configured to separate the biological material from the liquid mixture; and an extraction chamber configured to accommodate the liquid mixture; wherein the controller is configured to control circulation of the liquid mixture by controlling delivery of the liquid mixture from a downstream portion of the extraction chamber to at least one of: the filter and an upstream portion of the extraction chamber.

In some embodiments, the filter may include: a filtering compartment adapted to receive and accommodate the biological material; and one or more conduits comprising multiple sprinkling holes, the one or more conduits are connectable to a solvent supply unit and adapted to deliver the liquid solvent and to sprinkle the liquid solvent into the filtering compartment through the multiple sprinkling holes.

In some embodiments, the filtering compartment comprises an aperture through which the biological material may be introduced into the filtering compartment; the device comprises a covering adapted to removably cover the aperture; and at least one of the one or more conduits is attached to the covering.

In some embodiments, at least the filtering compartment of the filter is deformable; the device may include a filter deforming mechanism; and the controller is configured to control the filter deforming mechanism to deform at least the filtering compartment of the filter to squeeze the biological material and to remove residuals of the liquid mixture from the biological material.

In some embodiments, the evaporation and reaction unit may include: an evaporation and reaction chamber; and a heating element; wherein the controller is configured to at least one of: control the heating element to heat the liquid mixture in the evaporation and reaction chamber above a boiling temperature of the liquid solvent to evaporate the solvent from the liquid mixture; and control the heating element to heat the liquid mixture above a specified temperature value to induce at least one component of the liquid mixture undergo a specified chemical reaction.

In some embodiments, the evaporation and reaction chamber tapers in a direction extending from an upstream portion to a downstream portion of the evaporation and reaction chamber.

In some embodiments, the evaporation and reaction chamber comprises a liquid mixture compartment at the downstream portion thereof, the liquid mixture compartment is adapted to accommodate the liquid mixture that has not been evaporated; and a volume of the liquid mixture compartment is predetermined based on a maximal volume of the liquid mixture that may be produced by the device during one operational cycle.

In some embodiments, the heating element is disposed adjacent to the liquid mixture compartment.

In some embodiments, the controller is configured to control a cleaning of the device, the controller is configured to: control delivery of the liquid solvent to the extraction unit; control delivery of the liquid solvent from the extraction unit to the evaporation unit; and control evaporation of the liquid solvent in the evaporation and reaction unit.

In some embodiments, the controller is configured to: control delivery of the liquid solvent from the evaporation and reaction unit to the storage unit; detect safe connection of a dedicated cleaning capsule to the storage unit; and control filling of the dedicated cleaning capsule with the liquid solvent from the storage unit.

In some embodiments, the device may include a housing, the housing may include: a barrier structure that divides an interior of the housing into a first sub-zone and a second sub-zone; wherein the first sub-zone comprises is free of any electrical components; and wherein the barrier structure is sealed to prevent transfer of flammable vapors from the first sub-zone to the second sub-zone.

Some embodiments may provide a kit comprising the device as described above and one or more capsules removably connectable to the one or more storage outlet ports of the storage unit and adapted to be filled with the liquid mixture from at least one of the one or more storage containers.

In some embodiments, each of the one or more capsules may include: a flexible reservoir that may include: an inlet removably connectable to the storing unit and configured to enable filling of the liquid mixture into the reservoir, and an outlet configured to enable outflow of the liquid mixture from reservoir upon compression thereof; and a pressure applicator configured to apply pressure to the flexible reservoir to press the reservoir.

In some embodiments, the pressure applicator of each of the one or more capsules may include: a first arm; a second arm; and an arms-connector connecting the first arm and the second arm at one of their ends; the reservoir is disposed between the first arm and the second arm and adapted to be pressed by the first arm and the second arm when the arms are pressed against each other; the first arm and the second arm are made of elastic material and return to their initial state when the pressure thereon is released.

In some embodiments, the first arm and the second arm of at least one of the one or more capsules comprise matching wave-like surfaces facing each other.

In some embodiments, the first arm and the second arm of at least one of the one or more capsules comprises a first protrusion and a second protrusion, respectively, at free ends thereof, the first protrusion and the second protrusion are adapted to contact when the first arm and the second arm are pressed against each other.

In some embodiments, each of the one or more capsules comprises a capsule identifier configured to store a capsule-related information.

Some embodiments may provide a device for automatic extraction, storage and encapsulation of fatty compounds, the device may include: a solvent supply unit configured to at least one of supply and store a liquid solvent; an extraction unit configured to extract fatty compounds from biological material using the liquid solvent to provide a liquid mixture; a diluting liquid supply unit configured to at least one of supply and store a diluting liquid; an evaporation and reaction unit; a storage unit that may include one or more storage outlet ports; fluid conduits connecting the solvent supply unit with the extraction unit, the evaporation and reaction unit with the extraction unit and the storage unit with the evaporation and reaction unit and the diluting liquid supply unit with the evaporation and reaction unit; and a controller configured to: receive user's preferences concerning the liquid mixture to be produced; determine operation parameters based on the user's preferences; control delivery of the liquid solvent from the solvent supply unit to the extraction unit based on the determined operation parameters; control extraction of the fatty compounds in the extraction unit based on the determined operation parameters; control delivery of the liquid mixture from the extraction unit to the evaporation and reaction unit based on the determined operation parameters; control evaporation of the solvent from the liquid mixture in the evaporation and reaction unit based on the determined operation parameters; control delivery of a diluting liquid from the diluting liquid supply unit to the evaporation and reaction unit based on the determined operation parameters; control delivery of the liquid mixture from the evaporation and reaction unit to the storage unit based on the determined operation parameters; detect safe connection of each of at least one of one or more capsules to one of the one or more storage outlet ports of the storage unit; and control filling of at least one of the one or more connected capsules with the liquid mixture from the storage unit based on the determined operation parameters.

Some embodiments may provide an evaporation and reaction unit that may include: an evaporation and reaction chamber configured to receive at least one of a liquid mixture and a diluting liquid, the evaporation and reaction chamber tapers in a direction extending from an upstream portion to a downstream portion thereof and may include a liquid mixture compartment at the downstream portion thereof, the liquid mixture compartment is adapted to accommodate at least one of the liquid mixture and the diluting liquid that has not been evaporated; and a controllable heating element disposed adjacent to the liquid mixture compartment of the evaporation and reaction chamber.

Some embodiments may provide a device for storage and encapsulation of fatty compounds, the device may include: one or more storage containers each adapted to accommodate a liquid mixture containing fatty compounds; one or more storage outlet ports in fluid communication with at least one of the one or more storage containers; and a controller configured to: receive user's preferences concerning one or more desired liquid mixture; detect safe connection of each of at least one of one or more capsules to one of the one or more the storage outlet ports; and control filling of at least one of the one or more connected capsules with at least one of the one or more desired liquid mixtures based on the user's preferences.

Some embodiments may provide a kit that may include the device storage and encapsulation of fatty compounds as described above and one or more capsules removably connectable to the one or more storage outlet ports and adapted to be filled with the liquid mixture from at least one of the one or more storage containers.

Some embodiments may provide a capsule for encapsulation of a liquid mixture, the capsule may include: a flexible reservoir that may include: an inlet removably connectable to the storing unit and configured to enable filling of the liquid mixture into the reservoir, and an outlet configured to enable outflow of the liquid mixture from reservoir upon compression thereof; and a pressure applicator configured to apply pressure to the flexible reservoir to press the reservoir.

In some embodiments, the pressure applicator may include: a first arm; a second arm; and an arms-connector connecting the first arm and the second arm at one of their ends; the reservoir is disposed between the first arm and the second arm and adapted to be pressed by the first arm and the second arm when the arms are pressed against each other; the first arm and the second arm are made of elastic material and return to their initial state when the pressure thereon is released.

In some embodiments, the first arm and the second arm comprise matching wave-like surfaces facing each other.

In some embodiments, the first arm may include a first protrusion and the second arm comprises a second protrusion at free ends thereof, the first protrusion and the second protrusion are adapted to contact when the first arm and the second arm are pressed against each other.

In some embodiments, the capsule may include a capsule identifier configured to store a capsule-related information.

Some embodiments may provide a filter that may include: a filtering compartment; and one or more conduits comprising multiple sprinkling holes, the one or more conduits are connectable to a solvent supply unit and adapted to deliver the liquid solvent and to sprinkle the liquid solvent into the filtering compartment through the multiple sprinkling holes.

In some embodiments, the filtering compartment comprises an aperture through which the biological material may be introduced into the filtering compartment and wherein at least one of the one or more conduits is attached to the covering.

In some embodiments, at least the filtering compartment of the filter is deformable.

Some embodiments may provide a method of automatic extraction, storage and encapsulation of fatty compounds, the method may include: receiving, by a device, user's preferences concerning a liquid mixture to be produced by the device; determining, by the device, operation parameters based on the user's preferences; controlling, by the device, a supply of a liquid solvent based on the determined operation parameters; controlling, by the device, extraction of fatty compounds from biological material using the liquid solvent, based on the determined operation parameters, to provide a liquid mixture containing fatty compounds and the liquid solvent; controlling, by the device, evaporation of the solvent from the liquid mixture, based on the determined operation parameters; and controlling, by the device, filling of one or more capsule with the liquid mixture, based on the determined operation parameters.

In some embodiments, the method may include controlling, by the device, circulation of at least one of the liquid mixture and the liquid solvent, based on the determined operation parameters.

In some embodiments, the method may include controlling, by the device, a temperature of at least one of the liquid solvent being supplied and the liquid mixture being circulated, based on the determined operation parameters.

In some embodiments, the method may include controlling, by the device, squeezing of the biological material to remove residuals of the liquid mixture from the biological material.

In some embodiments, the method may include controlling, by the device, dilution of the liquid mixture with a diluting liquid, based on the determined operation parameters.

In some embodiments, the method may include controlling, by the device, a specified chemical reaction of at least one component of the liquid mixture, based on the determined operation parameters.

In some embodiments, the method may include controlling, by the device, cleaning of the device.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
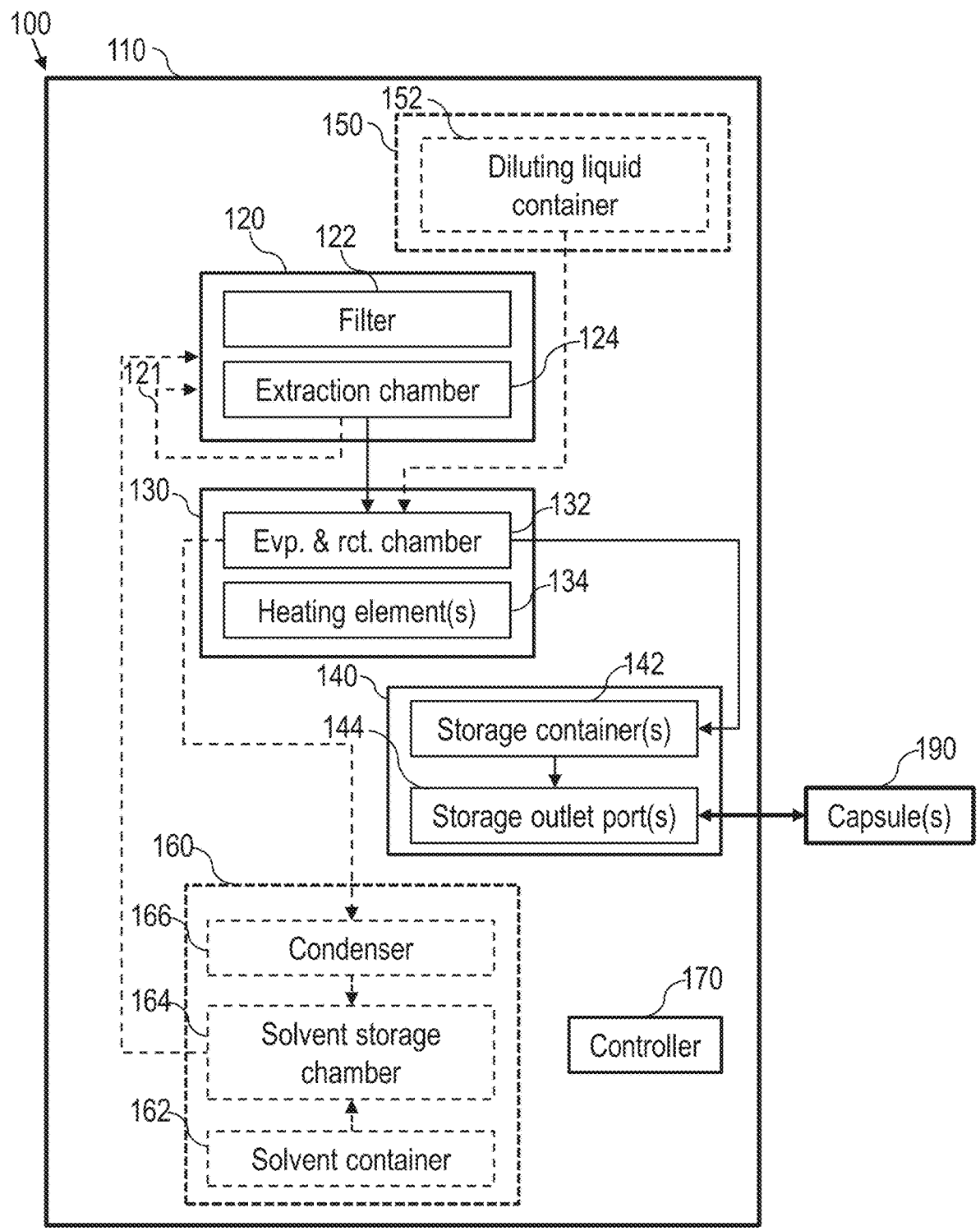
FIG. 1 which is a block diagram of a device for automatic extraction, storage and encapsulation of fatty compounds, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a block diagram of a device 100 for automatic extraction, storage and encapsulation of fatty compounds, according to some embodiments of the invention.

In some embodiments, device 100 may include a housing 110. Housing 110 may be adapted to accommodate at least some units of device 100 and/or removably accommodate at least some units of device 100.

Device 100 may include an extraction unit 120. In some embodiments, extraction unit 120 may include a filter 122 and an extraction chamber 124. Extraction unit 120 may receive a biological material and a liquid solvent. For example, the biological material may include at least a portion of a *Cannabis* plant. The fatty compounds may, for example, include at least one of: Cannabidiol (CBD), tetrahydrocannabinol (THC) and a mixture of CBD and THC. The liquid solvent may be, for example, an alcohol (e.g., ethanol).

Extraction unit 120 may enable mixing of the liquid solvent with the biological material to provide a liquid mixture containing fatty compounds extracted from the biological material and the liquid solvent. Filter 122 may separate the biological material from the liquid mixture. Liquid mixture may be drained into extraction chamber 124. In some embodiments, extraction unit 120 may enable circulation 121 of the liquid mixture through at least one of filter 122 and extraction chamber 124 (e.g., re-flowing the liquid mixture at least one more time through extraction unit 120).

Device 100 may include an evaporation and reaction unit 130. Evaporation and reaction unit 130 may be in fluid communication with extraction unit 120. Evaporation and reaction unit 130 may include an evaporation and reaction chamber 132 and one or more heating elements 134. Evaporation and reaction chamber 132 may receive the liquid mixture from extraction chamber 124 of extraction unit 120. Heating element(s) 134 may heat the liquid mixture within evaporation and reaction chamber 132 to elevate a temperature of the liquid mixture above one or more predetermined temperature values. For example, heating element(s) 134 may heat the liquid mixture above a boiling temperature of the solvent to evaporate the solvent from the liquid mixture. In another example, heating element(s) 134 may heat the liquid mixture to a specified temperature value to let at least one component of the liquid mixture undergo a specified chemical reaction (e.g., when the fatty compounds require activation in a specific temperature). For example, the Hemp plant may contain cannabinoids, some of which may be utilized only after being activated in a specific temperature.

Device 100 may include a storage unit 140. Storage unit 140 may be in fluid communication with evaporation and reaction chamber 132 of evaporation and reaction unit 130. Storage unit 140 may include one or more storage containers 142. Storage container(s) 142 may receive and accommodate the liquid mixture (e.g., containing mainly the extracted fatty compounds) from evaporation and reaction chamber 132. Storage unit 140 may include one or more storage outlet ports 144. Storage outlet port(s) 144 may be in fluid communication with storage container(s) 142 and may enable controlled removal of the liquid mixture from storage container(s) 142 and/or controlled filling of one or more capsules 190.

In some embodiments, device 100 may be configured to controllably fill one or more capsule(s) 190. Capsule(s) 190 may be removably connectable to storage outlet port(s) 144 of storage unit 140. For example, housing 110 of device 100 may include a port adapted to removably accommodate capsule(s) 190. Upon the connection of capsule(s) 190 to storage outlet port(s) 144 fluid connection may be established therebetween. Storage unit 140 may fill capsule(s) 190 with the liquid mixture from storage container(s) 142 through storage outlet port(s) 144 in a controlled manner. Capsule(s) 190 may be adapted to releasably accommodate the liquid mixture. Upon completion of the filling, capsule(s) 190 may be disconnected from storage outlet port(s) 144 and may be used for distributing/consuming the liquid mixture (e.g., containing mainly fatty compounds).

In some embodiments, device 100 may include one or more capsules 190. For example, device 100 may be supplied with one or more capsules 190. Some embodiments of the present invention may provide a kit including device 100 and one or more capsules 190.

In some embodiments, device 100 may include a diluting liquid supply unit 150. Diluting liquid supply unit 150 may be in fluid communication with evaporation and reaction chamber 132 of evaporation and reaction unit 130. Diluting liquid supply unit 150 may include a diluting liquid container 152. Diluting liquid container 152 may accommodate a diluting liquid. For example, diluting liquid may be a neutral oil.

In some embodiments, diluting liquid container 152 may be disposed within housing 110 of device 100 and may be fillable with the diluting liquid. For example, housing 110 may include an aperture in fluid communication with diluting liquid container 152 through which diluting liquid container 152 may be filled with the diluting liquid.

In some embodiments, diluting liquid container 152 may be removably insertable into housing 110. For example, housing 110 may include a port configured to receive diluting liquid container 152 prefilled with the diluting liquid and to establish fluid communication between the liquid diluting container 152 and device 100.

Diluting liquid supply unit 150 may supply the diluting liquid from diluting liquid container 152 to evaporation and reaction chamber 132 of evaporation and reaction unit 130 in a controlled manner. In various embodiments, diluting liquid supply unit 140 may supply the diluting liquid prior to, during or after the evaporation of the solvent from the liquid mixture.

In some embodiments, device 100 may include a solvent supply unit 160. In some embodiments, solvent supply unit 160 may include a solvent container 162. Solvent container 162 may accommodate the liquid solvent.

In some embodiments, solvent container 162 may be disposed within housing 110 of device 100 and may be fillable with the liquid solvent. For example, housing 110 may include an aperture in fluid communication with solvent container 162 through which the liquid solvent may be filled into to solvent container 162. In some embodiments, solvent container 162 may be removably insertable into housing 110. For example, housing 110 may include a port configured to receive solvent container 162 prefilled with the liquid solvent and to establish fluid communication of solvent container 162 with device 100.

In some embodiments, solvent supply unit 160 may include a solvent storage chamber 164. In some embodiments, solvent container 162 may be in fluid communication with solvent storage container 164 such that the liquid solvent may be supplied from solvent container 162 to solvent storage chamber 164. Solvent supply unit 160 may supply the liquid solvent from solvent storage chamber 164 to extraction unit 120 (e.g., to filter 122 and/or extraction chamber 124) in a controlled manner.

In some embodiments, solvent supply unit 160 may include a condenser 166 disposed between evaporation and reaction chamber 132 of evaporation and reaction unit 130 and solvent storage chamber 164. Condenser 164 may collect evaporated solvent from evaporation and reaction chamber 132 of evaporation and reaction unit 130, condense the evaporated solvent into the liquid solvent and supply the liquid solvent to solvent storage chamber 164.

Device 100 may include fluid conduits that may connect at least some of units of device 100, e.g., as described above and as shown in FIG. 1. Device 100 may include controllable valves and/or controllable pumps disposed along at least some of the fluid conduits thereof to enable control over the process of extraction, storage and encapsulation of fatty compounds.

Device 100 may include a controller 170. Controller 170 may be in communication with extraction unit 120, evaporation and reaction unit 130, storage unit 140, and optionally with diluting liquid supply unit 150, solvent supply unit 160, controllable valves and/or controllable pumps. Controller 170 may be configured to control the operation of different units, valves and/or pumps of device 100 to enable automatic extraction, storage and encapsulation of fatty compounds (e.g., as described below with respect to FIG. 2).

Figure 2:
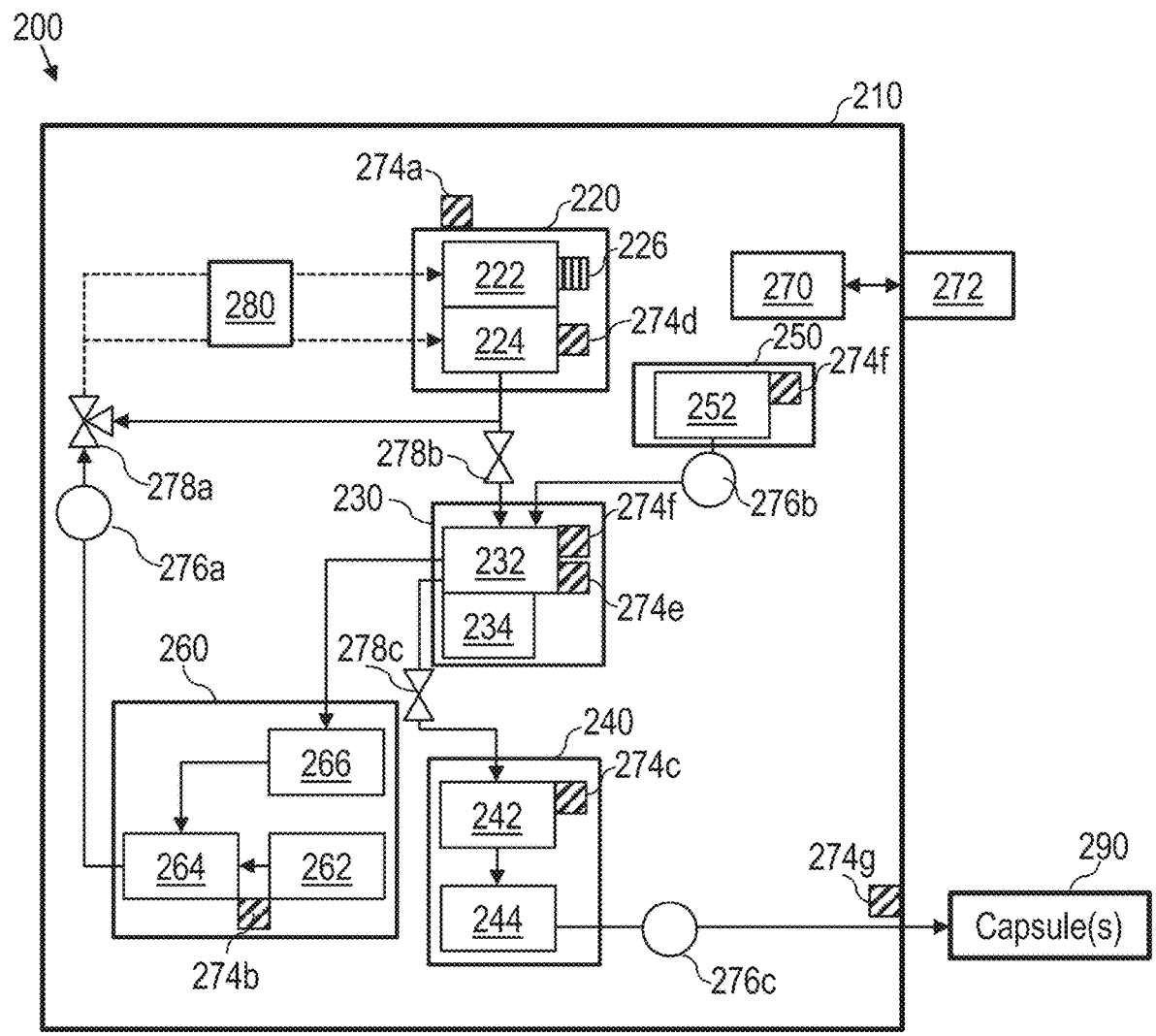
FIG. 2 is a block diagram of a more detailed aspect of a device for automatic extraction, storage and encapsulation of fatty compounds, according to some embodiments of the invention.

Reference is now made to FIG. 2, which is a block diagram of a more detailed aspect of a device 200 for automatic extraction, storage and encapsulation of fatty compounds, according to some embodiments of the invention.

Device 200 may be similar to device 100 described above with respect to FIG. 1 in the sense that similar units provide similar functionalities. According to some embodiments, device 200 may include a housing 210, an extraction unit 220 (e.g., including a filter 222 and an extraction chamber 224), an evaporation and reaction unit 230 (e.g., including an evaporation and reaction chamber 232 and one or more heating elements 234), a storage unit 240 (e.g., including one or more storage containers 242 and one or more storage outlet ports 244), a diluting liquid supply unit 250 (e.g., including diluting liquid container 252), a solvent supply unit 260 (e.g., including solvent container 262, solvent storage chamber 264 and condenser 266) and a controller 270.

In some embodiments, device 200 may include a user interface 272. User interface 272 may be in communication (e.g., wired and/or wireless) with controller 270. User interface 272 may, for example, include at least one of a display, touch screen, buttons, light indicators, etc. In some embodiments, controller 270 may receive preferences of a user of device 200, related to modes of operation and operation parameters, via user interface 272. For example, the user's preferences may include a type of biological material and/or fatty compounds to be extracted, a desired concentration of the fatty compounds in the liquid mixture, a desired viscosity of the liquid mixture, etc. Controller 270 may determine operation parameters for device 200 based on the user's preferences. Controller 270 may provide instruction to the user of device 200 via user interface 272 (e.g., visual instructions, audio instructions, etc.).

Device 200 may include sensors (collectively referred hereinafter as "sensors 274"), pumps (collectively referred hereinafter as "pumps 276") and valves (collectively referred hereinafter as "valves 278"). Sensors 274, pumps 276 and valves 278 may be in communication (e.g., wired and/or wireless) with controller 270. Controller 270 may receive readings from sensors 274 and may control pumps 276 and valves 278 to operate various units of device 200 based on the readings of sensors 274 and/or according to the predetermined operation program.

Controller 270 may control extraction of fatty compounds from biological material into the liquid mixture using the liquid solvent, evaporation of the solvent from the liquid mixture, optionally dilution the liquate mixture with the diluting liquid, optionally induction of the specified chemical reaction of at least one component of the liquid mixture (e.g., decarboxylation of Hemp), storage of the liquid mixture and filling of capsule(s) 290 with the liquid mixture for further distribution/consumption.

The description made below with respect to FIG. 2 presents an example of a process that may be performed by device 200 to extract, store and encapsulate the extracted fatty compounds. Functions being performed by different units of device 200 may be controlled by controller 270 via pumps 276 and valves 278 and based on readings of sensors 274 and operation parameters determined based on the user's preferences. Advantageously, device 200 may enable fully automated, self-operated extraction, storage and encapsulation of the fatty compounds.

At first stage, controller 270 may prompt, via user interface 272, the user of device 200 to place a desired biological material within filter 222 of extraction unit 220 via an input lid. Controller 270 may prompt the user to select, via user interface 272, user's preferences concerning, for example, a type of biological material and/or fatty compounds to be extracted, an amount of the biological material, a desired concentration of the fatty compounds in the liquid mixture, a desired viscosity of the liquid mixture, etc.

Controller 270 may determine the operation parameters for device 200 based on the user's preferences. The operation parameters may, for example, include at least one of: a required amount of the solvent liquid, a required extraction time interval, indication whether dilution is required or not, a required amount of the diluting liquid, indication whether the specified chemical reaction (e.g., decarboxylation) is required or not, temperature for the specified chemical reaction, time interval for the chemical reaction, etc.

In some embodiments, controller 270 may determine whether the input lid of extraction unit 220 is closed or open. For example, device 200 may include an input lid sensor 274*a* configured to indicate whether the input lid of extraction unit 220 is closed or open. Controller 270 may prevent operation of device 200 if input lid sensor 274*a* indicates that the input lid is open. In this case, controller 270 may, for example, instruct the user, via user interface 272, to close the input lid.

In some embodiments, controller 270 may determine whether solvent supply unit 260 contains the required amount of the liquid solvent. For example, device 200 may include a first liquid amount sensor 274*b* (e.g., liquid level sensor) configured to measure an amount of the liquid solvent within solvent container 262 and/or solvent storage chamber 264 of solvent supply unit 260. Controller 270 may prevent operation of device 200 if there is no required amount of the liquid solvent in solvent supply unit 260. In this case, controller 270 may, for example, instruct the user, via user interface 272, to replace and/or to fill solvent container 262 or solvent storage container 264 with the liquid solvent.

In some embodiments, controller 270 may determine whether there is a sufficient volume in storage container(s) 242 of storage unit 240 to accommodate the volume of the liquid mixture to be produced during current operation cycle. For example, device 200 may include a second liquid amount sensor 274*c* (e.g., liquid volume sensor/liquid level sensor) configured to measure a volume of the liquid mixture contained within storage container(s) 242. Controller 270 may prevent operation of device 200 if there is no sufficient volume in storage container(s) 242 to accommodate the volume of the liquid mixture to be produced during current operation cycle. In this case, controller 270 may, for example, instruct the user, via user interface 272, to empty/partly empty storage container(s) 242.

At next stage, controller 270 may control a supply of the liquid solvent from solvent supply unit 260 to extraction unit 220. For example, device 200 may include a first pump 276*a* disposed downstream solvent supply unit 260 and upstream extraction unit 220. Controller 270 may control solvent pump 276*a* to pump the liquid solvent from solvent storage container 264 of solvent supply unit 260 to extraction unit 220 (e.g., through filter 222 and/or directly to extraction chamber 224).

In some embodiments, controller 270 may determine that extraction chamber 224 of extraction unit 220 contains the required amount of the liquid solvent and control solvent pump 276*a* to stop the pumping. For example, device 200 may include a third liquid amount sensor 274*d* (e.g., liquid level sensor) configured to measure the amount of the liquid solvent within extraction chamber 224 of extraction unit 220.

At next stage, controller 270 may optionally control a circulation of the liquid solvent/the liquid mixture containing the liquid solvent and fatty compounds extracted from the biological material. For example, controller 270 may control first pump 276*a* to pump the liquid mixture from downstream of extraction chamber 224 of extraction unit 220 to upstream thereof, possibly via filter 222 or directly to extraction chamber 224. For example, device 200 may include a first valve 278*a* (e.g., 3-way valve) that may be controlled by controller 270 to switch between pumping the liquid solvent and circulation of the liquid mixture.

In some embodiments, device 200 may include a heater/cooler 280. Controller 270 may control heater/cooler 280 to cool or heat the liquid solvent and/or the liquid mixture being circulated. The measure of cooling or heating may be determined based on the determined operation parameters.

In some embodiments, controller 270 may control first pump 276*a* to stop circulation of the liquid solvent/liquid mixture after the predetermined extraction time interval. The extraction time interval may be determined based on the predetermined operation parameters (e.g., temperature of the liquid solvent/liquid mixture).

At next stage, controller 270 may optionally control deformation or spinning of filter 222 of extraction unit 220 to squeeze the biological material contained within filter 222. The deformation/spinning may remove residuals of the liquid mixture from the biological material. For example, filter 222 may be deformable (e.g., as described below with respect to FIG. 4) and extraction unit 220 may include a filter deforming mechanism 226 adapted to deform (e.g., press or twist) filter 222.

At next stage, controller 270 may control evaporation of the solvent from the liquid mixture. Controller 270 may open a second valve 278*b* (e.g., 2-way valve) disposed downstream to extraction chamber 224 of extraction unit 220 and upstream to evaporation and reaction chamber 232 of evaporation and reaction unit 230 to enable the liquid mixture to flow from extraction chamber 224 to evaporation and reaction chamber 232. For example, controller 270 may keep second valve 278*b* open for a predetermined time interval, upon which controller 270 may close second valve 278*b*. In some embodiments, device 200 may include a dedicated pump for delivering the liquid mixture from extraction chamber 224 of extraction unit 220 to evaporation and reaction chamber 232 of evaporation and reaction unit 230.

Controller 270 may control heating element(s) 234 to heat the liquid mixture above a boiling temperature of the liquid solvent to evaporate the solvent from the liquid mixture. Condenser 264 of solvent supply unit 260 may collect evaporated solvent from evaporation and reaction chamber 232 of evaporation and reaction unit 230, condense the evaporated solvent into the liquid solvent and supply the liquid solvent to solvent storage chamber 264.

In some embodiments, device 200 may include a temperature sensor 274e configured to measure a temperature of the liquid mixture. Controller 270 may control the heating element(s) 234 based on readings of temperature sensor 274e to ensure a desired temperature within evaporation and reaction chamber 232.

In various embodiments, controller 270 may stop evaporation of the solvent upon a predetermined evaporation time interval or when a pressure of the evaporated solvent within evaporation and reaction chamber reduces below a predetermined pressure value. The evaporation time interval may be predetermined based on, for example, the predetermined operation parameters (e.g., the amount of the liquid solvent being used, etc.). The pressure of the evaporated solvent within evaporation and reaction chamber 232 may be determined based on readings of a pressure sensor 274f.

At next stage, controller 270 may optionally control diluting of the liquid mixture with the diluting liquid. Controller 270 may control a second pump 276b configured to pump the diluting liquid from diluting liquid container 252 of diluting liquid unit 250 to evaporation and reaction chamber 232 of evaporation and reaction unit 230. The amount of required diluting liquid may be determined based on the predetermined operation parameters (e.g., desired viscosity of the liquid mixture, etc.) In some embodiments, controller 270 may control second pump 276b to pump the diluting liquid for a predetermined time interval. The time interval may be determined based on, for example, the required amount of the diluting liquid and based on rheological properties of the diluting liquid. In some embodiments, diluting of the liquid mixture with the diluting liquid may be performed before evaporation of the solvent from the liquid mixture.

In some embodiments, controller 270 may determine whether diluting liquid container 252 of diluting liquid unit 250 contains a required amount of the diluting liquid. For example, device 200 may include a fourth liquid amount sensor 274f (e.g., liquid level sensor) configured to measure an amount of the diluting liquid within diluting liquid container 252. Controller 270 may prevent operation of device 200 or terminate the operation thereof if there is no required amount of the diluting liquid in diluting liquid container 252. In this case, controller 270 may, for example, instruct the user, via user interface 272, to replace and/or to fill diluting liquid container 252 with the diluting liquid.

At the next stage, controller 270 may optionally control heating element(s) 234 to heat the liquid mixture (e.g., containing the extracted fatty compounds and the diluting liquid) above a specified temperature value to induce at least one component of the liquid mixture undergo a specified chemical reaction. For example, if liquid mixture contains cannabinoids fatty compounds, heating the liquid mixture above a decarboxylation temperature of cannabinoids may cause decarboxylation of cannabinoids and thus get the cannabinoids ready for use.

In some embodiments, controller 270 may control heating element(s) 234 based on readings of temperature sensor 274e (e.g., to ensure the required reaction temperature within evaporation and reaction chamber 232) and for a predetermined reaction time interval (e.g., decarboxylation time interval). The reaction time interval may be determined based on the predetermined operation parameters and/or parameters of the at least one component undergoing the chemical reaction (e.g., each cannabinoid may have few decarboxylation set points of temperature and time).

In some embodiments, the chemical reaction may be induced before dilution of the liquid mixture with the diluting liquid. In some embodiments, device 200 may include a dedicated reaction unit (e.g., being not a part of evaporation and reaction unit 230).

At next stage, controller 270 may control delivery of the liquid mixture (e.g., containing mainly fatty compounds, optionally containing decarboxylated fatty compounds, optionally containing the diluting liquid) from evaporation and reaction chamber 232 of evaporation and reaction unit 230 to storage unit 240. For example, controller 270 may open a third valve 278c disposed downstream evaporation and reaction chamber 232 of evaporation and reaction unit 230 and upstream storage container(s) 242 of storage unit 240 to enable flow of the liquid mixture from evaporation and reaction chamber 232 to storage container(s) 242. In some embodiments, device 200 may include a dedicated pump for pumping the liquid mixture from evaporation and reaction chamber 232 to storage container(s) 242.

At next stage, controller 270 may control filling of capsule(s) 290 with the liquid mixture from storage unit 240. Capsule(s) 290 may be removably connectable to storage outlet port(s) 244 of storage unit 240. Upon the connection of capsule(s) 290 to storage outlet port(s) 244 fluid connection may be established therebetween. Controller 270 may determine that capsule 290 has been properly connected to storage outlet port 244. For example, device 200 may include a capsule connection sensor 274g configured to detect that capsule 290 has been properly connected to storage outlet port 244. Capsule connection sensor 274g may, for example, include an RFID-based sensor, optical sensor, etc. Upon detection of proper connection of capsule 290 to storage outlet port 244, controller 270 may control a third pump 276c to pump a desired amount of the liquid mixture into capsule 290. For example, controller 270 may control third pump 276c to pump the liquid mixture for a predetermined time interval to fill the desired amount of the liquid mixture into capsule(s) 290. The time interval may be determined based on the operation parameters (e.g., the desired amount of the liquid mixture, etc.).

In some embodiments, controller 270 may determine whether storage container(s) 242 contain the required amount of the liquid mixture to be filled into capsule 290 based on readings of second liquid amount sensor 274c and the operation parameters. Controller 270 may prevent filling of capsule 290 if there is no required amount of the liquid mixture in storage container(s) 242. In this case, controller 270 may notify the user, via user interface 272, that there is no required amount of the liquid mixture to fill capsule 290.

Capsule(s) 290 may be removed from storage outlet port 244 of storage unit 240 upon filling thereof with the liquid mixture and used to distribute/consume the liquid mixture. Some embodiments of capsule 290 are described below with respect to FIGS. 7 and 8.

In some embodiments, device 200 may include one or more capsules 290. For example, device 200 may be supplied with one or more capsules 290. Some embodiments of the present invention may provide a kit including device 200 and one or more capsules 290.

In some embodiments, controller 270 may control a cleaning process of device 200. For example, controller 270 may notify the user via user interface 272 that cleaning of device 200 is required. For example, the cleaning may be required after a predefined number of operational cycles. The cleaning process may be initiated upon, for example, receipt of respective instructions from the user via user interface 272.

One example of the cleaning process may include circulating and evaporating the liquid solvent (e.g., as described above with respect to FIG. 2) while extraction unit 220 is empty of the biological material.

Another example of the cleaning process may include circulating and evaporating the liquid solvent (e.g., as described above with respect to FIG. 2) while extraction unit 220 is empty of the biological material, filling storage container(s) 242 with liquid cleaning residuals and removing liquid cleaning residuals using a dedicated cleaning capsule.

It is noted that each of units of device 200 may include fluid conduit(s) and connectors that provide fluid communication between components of these units and/or between different units thereof, as described above and shown in FIG. 2. It is also noted that other sensors 274, pumps 276, valves 278 and combinations thereof may be used according to specifications of device 200 and/or based on relative spatial configuration of different units of device 200 with respect to each other.

Figure 3A:
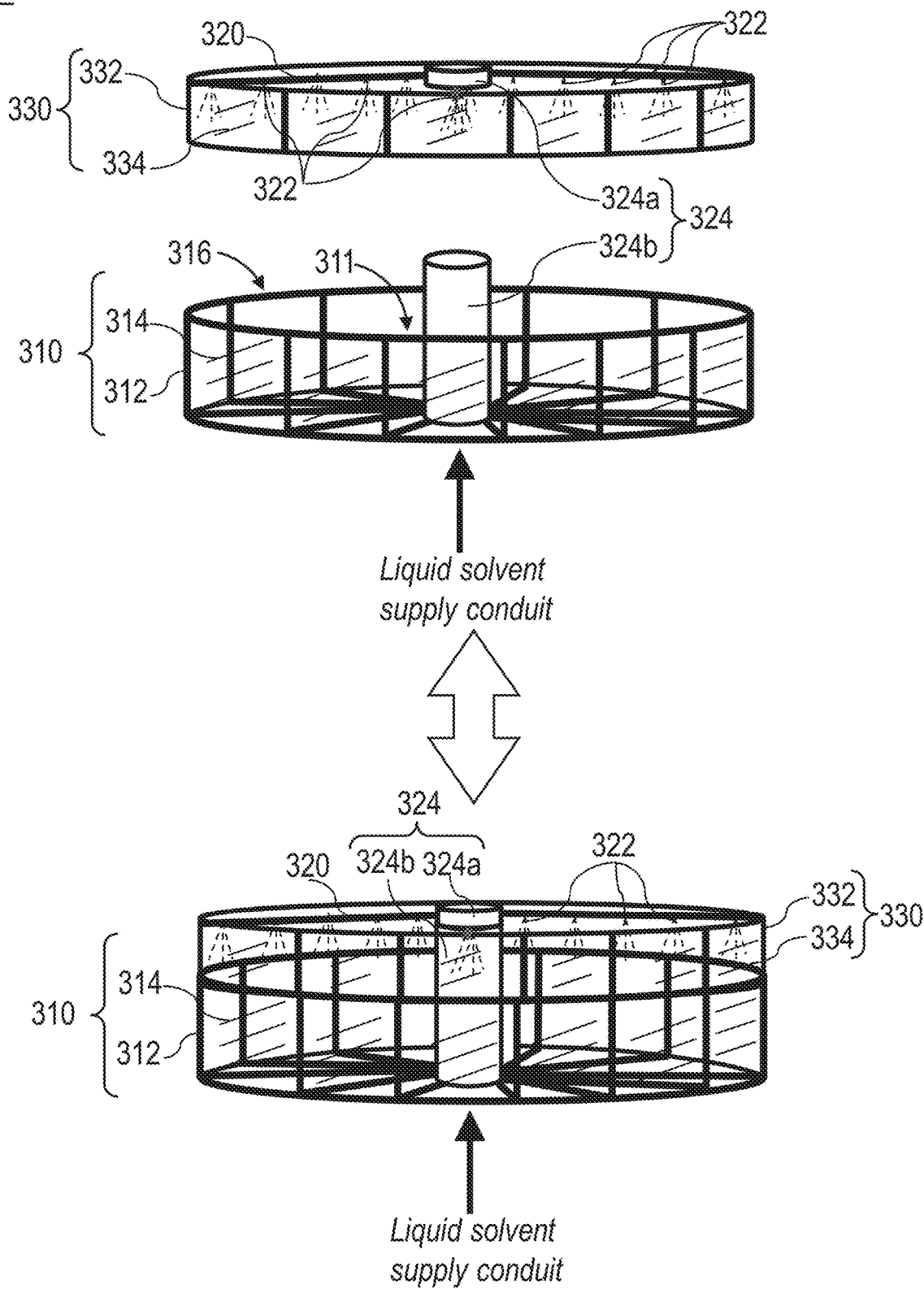
FIG. 3A which is a schematic illustration of a filter, according to some embodiments of the invention.

Reference is now made to FIG. 3A, which is a schematic illustration of a filter 300, according to some embodiments of the invention.

Filter 300 may include a filtering compartment 310 adapted to receive and accommodate a predefined amount of biological material. In some embodiments, filtering compartment 310 may include a frame 312 that supports a filtering material 314 (e.g., as shown in FIG. 3A). Filtering compartment 310 may include an aperture 316 through which biological material may be introduced into an interior 311 of filtering compartment 310. Frame 312 may be made of, for example, plastic. Filtering material 314 may be made of, for example, filtering paper or filtering fabric.

Filter 300 may include one or more conduits 320 each including multiple sprinkling holes or sprinklers 322 (e.g., as shown in FIG. 3A). Sprinkling holes or sprinklers 322 may face interior of 311 of filtering compartment 310. Conduit(s) 320 may deliver a liquid solvent and to sprinkle the liquid solvent into filtering compartment 310 through sprinkling holes or sprinklers 322 (e.g., as shown in FIG. 3A).

In some embodiments, filter 300 may include a covering 330 adapted to removably cover aperture 316 of filtering compartment 310. In some embodiments, covering 330 may include a frame 332 (e.g., similar to frame 312) that supports a filtering material 334 (e.g., similar to filtering material 314). In various embodiments, conduit(s) 320 may be disposed within or attached to covering 330 (e.g., as shown in FIG. 3A). In some embodiments, conduit(s) 320 may be disposed within filtering compartment 310. In general, conduit(s) 320 may be disposed at any spatial location and configuration within filter 300 that enables sprinkling of the liquid solvent into interior 311 of filtering compartment 310 through sprinkling holes or sprinklers 322.

In some other embodiments, filtering compartment 310 may, for example, be a closed compartment, prefilled with biological material. In these embodiment, filter 300 may not include any covering. Yet in these embodiments, conduit(s) 320 may be disposed within interior 311 of filtering compartment 310.

Filter 300 may include one or more fluid connectors 324 (e.g., as shown in FIG. 3A). Fluid connector(s) 324 may be in fluid communication with conduit(s) 320. Fluid connector(s) 324 may be removably connectable to a liquid solvent supply conduit and enable delivery of the liquid solvent from the liquid solvent supply conduit to conduit(s) 320.

In embodiments shown in FIG. 3A, filter 300 includes a first fluid connector 324a and a second fluid connector 324b. First fluid connector 324a may be disposed within or attached to covering 330 and may be fluid communication with conduit(s) 320. Second fluid connector 324b may extend through filtering compartment 310 and may be removably connectable at its first end to first fluid connector 324a and removably connectable at its second end to the liquid solvent supply conduit.

It is noted that other configurations of filtering connector(s) 324 are also possible. For example, filter 300 may include a single fluid connector (e.g., such as first filtering connector 324a) that may be externally connectable to the liquid solvent supply conduit (e.g., and not through filtering compartment 310 as shown in FIG. 3A).

Filter 300 may have different shapes. Filter 300 may have different dimensions. For example, filter 300 may be adapted to accommodate 10 gr, 20 gr or 30 gr of biological material (e.g., *Cannabis* plant). For example, filter 300 that is adapted to accommodate 30 gr of biological material may be larger than filter adapted to accommodate 20 gr of biological material.

Figure 3B:
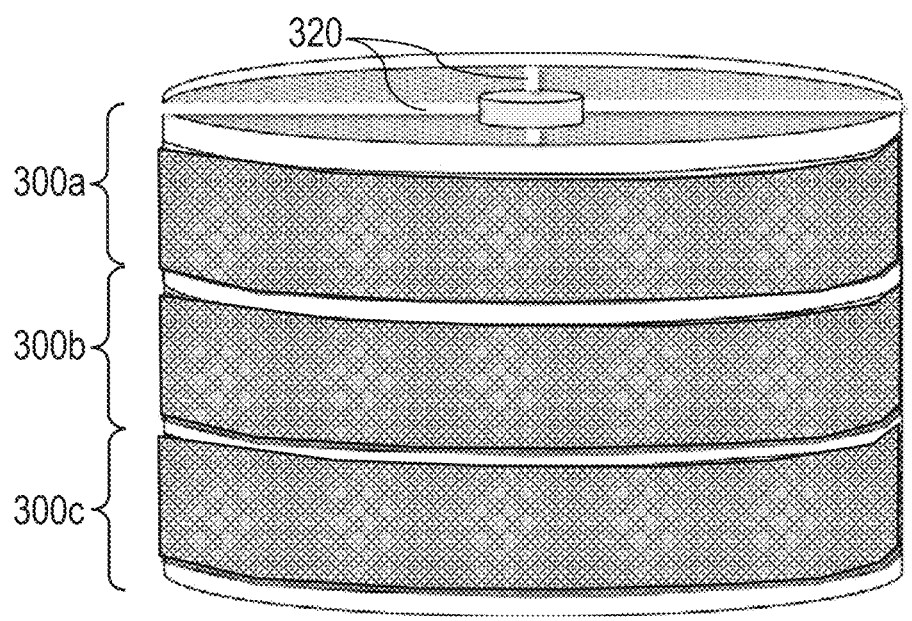
FIG. 3B is a schematic illustration of a filtering unit including two or more filters, according to some embodiments of the invention.

Reference is now made to FIG. 3B, which is a schematic illustration of a filtering unit 301 including two or more filters 300a, 300b, 300c, according to some embodiments of the invention.

Figure 3C:
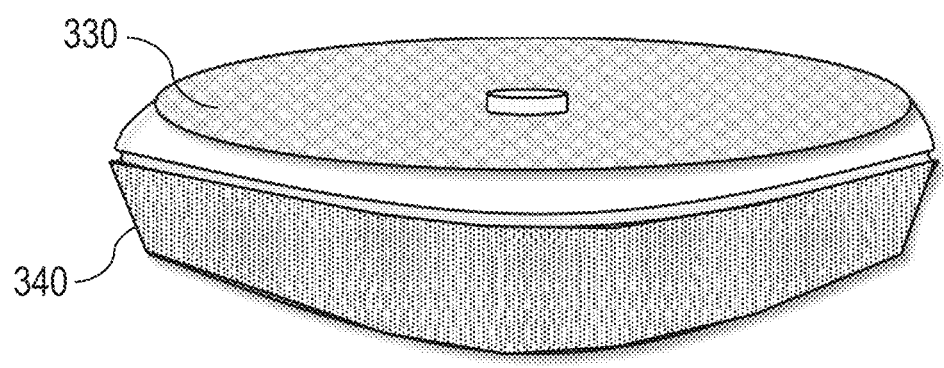
FIG. 3C is a schematic illustration of a filter including a housing, according to some embodiments of the invention.

In some embodiments, two or more filters may be connected in series to form a filtering unit 301 (e.g., as shown in FIG. 3C). For example, FIG. 3C depicts filtering unit 301 that includes three filters connected in series—a first filter 300a, a second filter 300b and a third filter 300c, each similar to filter 300 described above with respect to FIGS. 1A and 1B. In some embodiments, filters 300a, 300b, 300c may be in fluid communication with each other, for example, through their respective fluid connectors. Filtering unit 301 may, for example, enable to increase an amount of biological material and an amount of fatty compounds that may be extracted from biological material as compared to single filter 300.

Reference is now made to FIG. 3C, which is a schematic illustration of a filter 302 including a housing 340, according to some embodiments of the invention.

Filter 302 may be similar to filter 300 described above with respect to FIG. 1A. For example, filter 302 may include a filtering compartment 310 (not shown in FIG. 1C), conduit(s) 320 with sprinkling holes or sprinklers 322 (not shown in FIG. 1C), covering 330. Filter 302 may further include a housing 340. Housing 340 may accommodate filtering compartment 310 (e.g., as shown in FIG. 3C).

Filters (e.g., filters 300, 302) and filtering units (e.g., filtering unit 310) that may be used in a device for automatic extraction, storage and encapsulation of fatty compounds (e.g., device 100 and device 200 described hereinabove). For example, the filters and/or the filtering units may be used as filters in the extraction unit of the device (e.g., filter 122 and filter 222 described above hereinabove).

In some embodiments, filters 300, 302 may be deformable (e.g., as described below with respect to FIG. 4).

Figure 4:
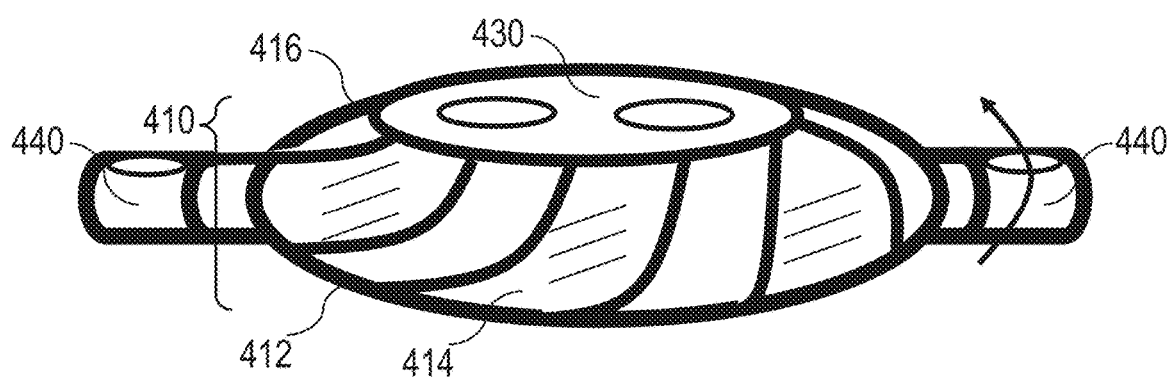
FIG. 4 is a schematic illustration of a deformable filter, according to some embodiments of the invention.
Figure 4:
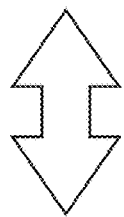
Figure 4:
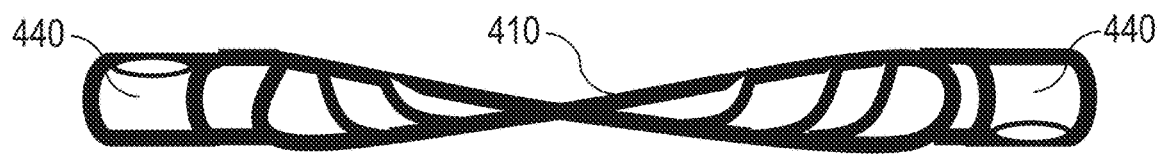

Reference is now made to FIG. 4, which is a schematic illustration of a deformable filter 400, according to some embodiments of the invention.

Filter 400 may include a filtering compartment 410 adapted to receive and accommodate a predefined amount of biological material.

In some embodiments, filtering compartment 410 may include an aperture 416 through which biological material may be introduced unto an interior of filtering compartment. In some embodiments, filter 400 may include a covering 430 adapted to removably cover aperture 416 of filtering compartment 410 (e.g., as shown in FIG. 4).

In some other embodiments, filtering compartment 410 may, for example, be a closed compartment, prefilled with biological material.

In some embodiments, filtering compartment 410 may include a frame 412 that supports a filtering material 414. Frame 412 may be made of, for example, flexible plastic. Filtering material 414 may be made of, for example, filtering paper or filtering fabric.

Flexible frame 412 may enable deformation of at least filtering compartment 410 of filter 400. For example, filtering compartment 410 may be pressed or twisted to at least partly collapse filter compartment 410. This may, for example, enable squeezing of biological material contained within filtering compartment 410 to remove residuals of the liquid mixture therefrom.

In embodiments shown in FIG. 4, filter 400 may include two catchers 440 oppositely disposed along a lateral surface of filtering compartment 410. At least one of catchers 440 may be rotatable (e.g., manually or using a dedicated rotating mechanism) to twist filtering compartment 410.

Filter 400 may be used in a device for extracting and storing fatty compounds (e.g., device 100 and device 200 described hereinabove). For example, filter 400 may be used as a filter in the extraction unit of the device (e.g., filter 122 and filter 222 described hereinabove).

Figure 5:
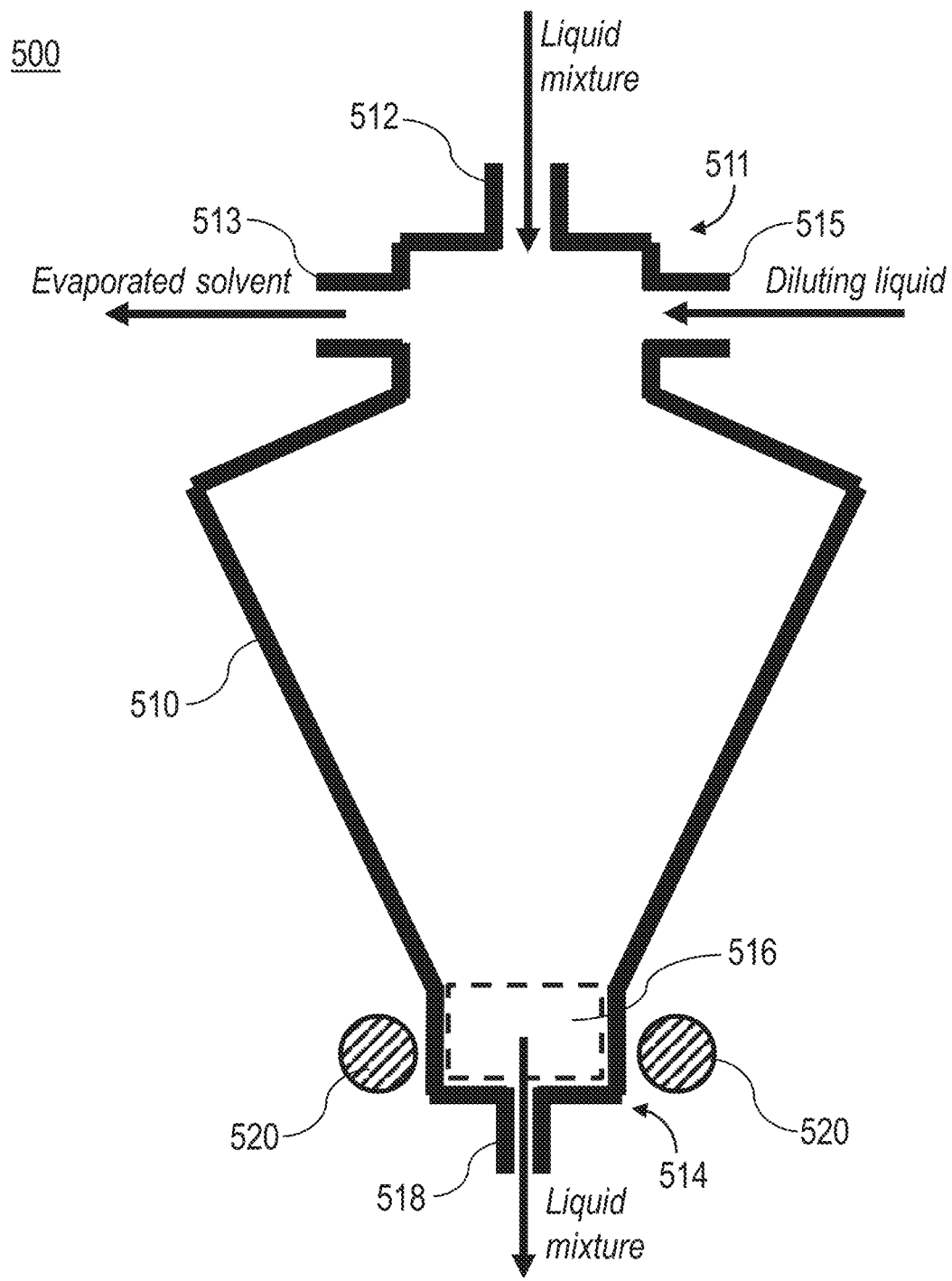
FIG. 5 is a schematic illustration of an evaporation and reaction unit, according to some embodiments of the invention.
Figure 6A:
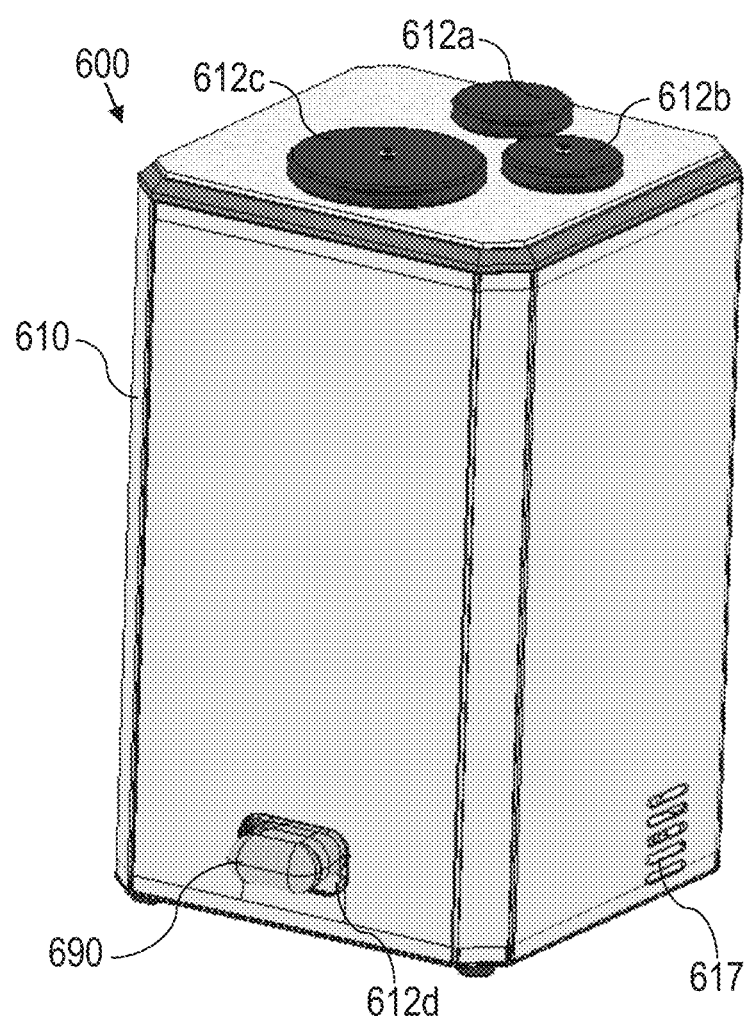
FIGS. 6A, 6B, 6C and 6D are schematic illustrations of one embodiment of a device automatic extraction, storage and encapsulation of fatty compounds, according to some embodiments of the invention.
Figure 6B:
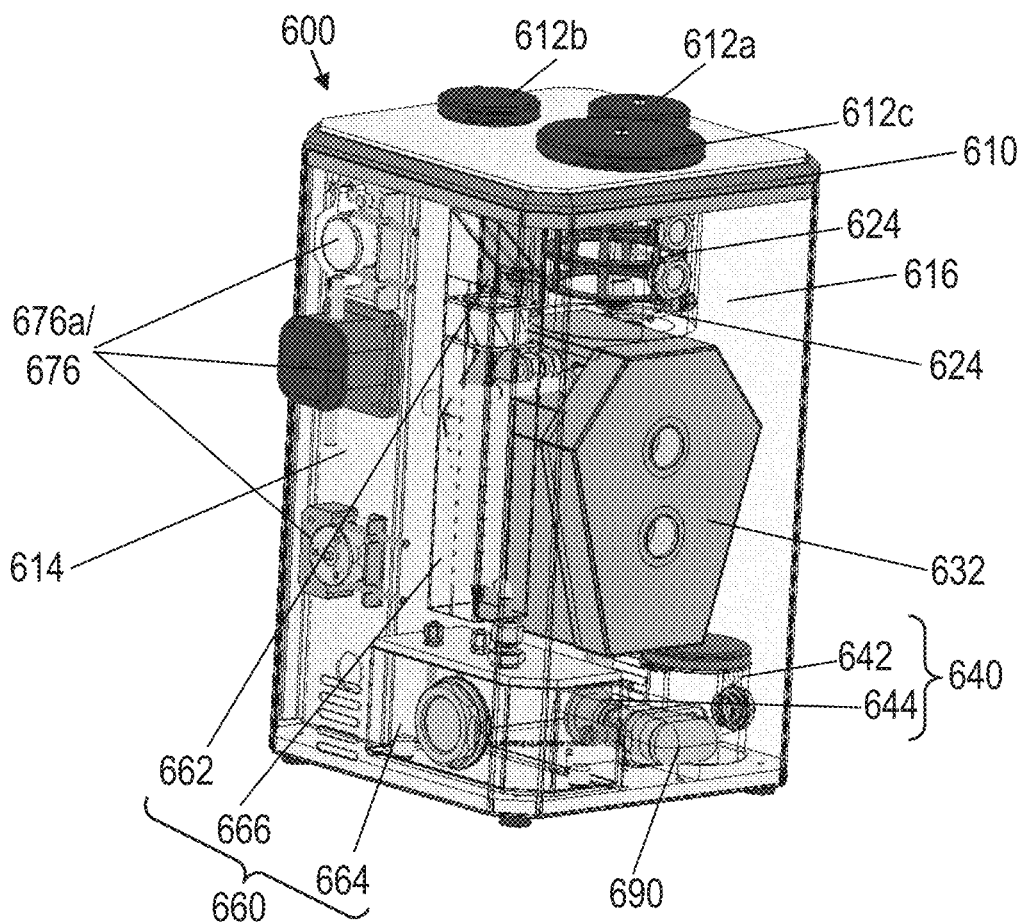
Figure 6C:
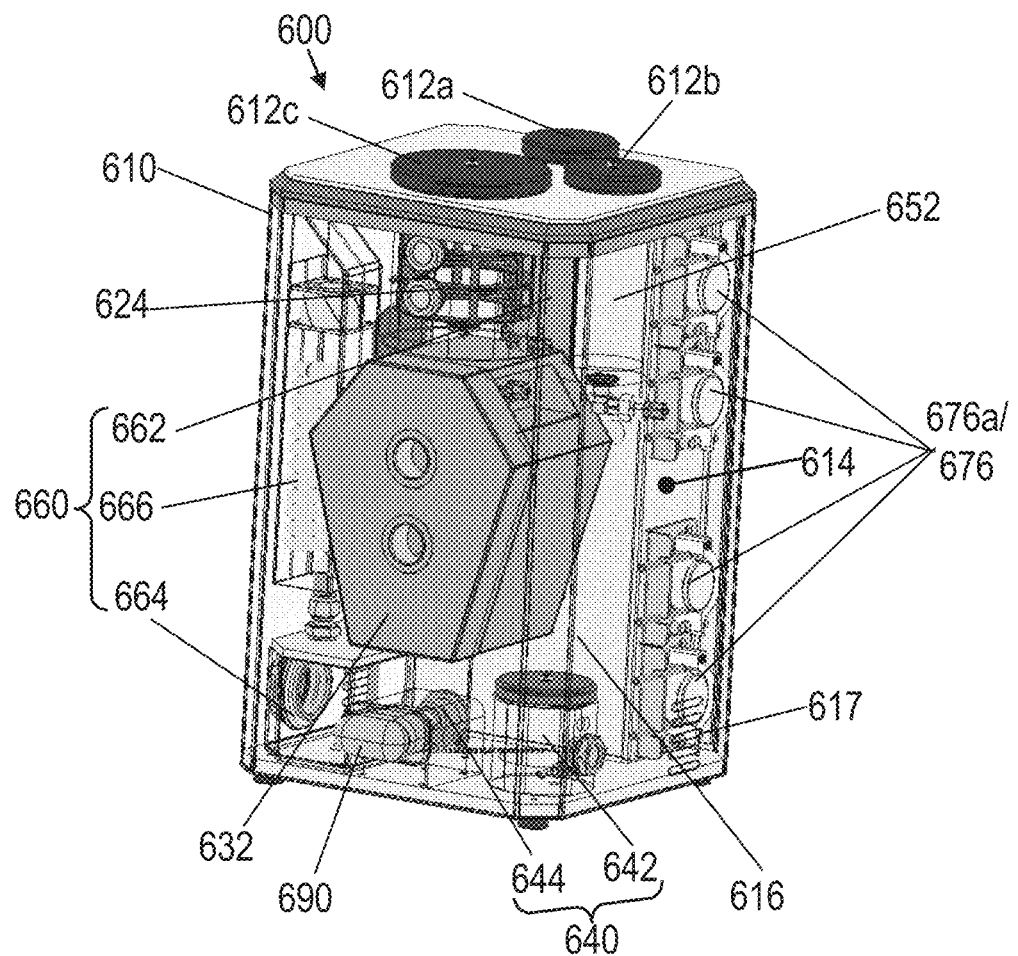
Figure 6D:
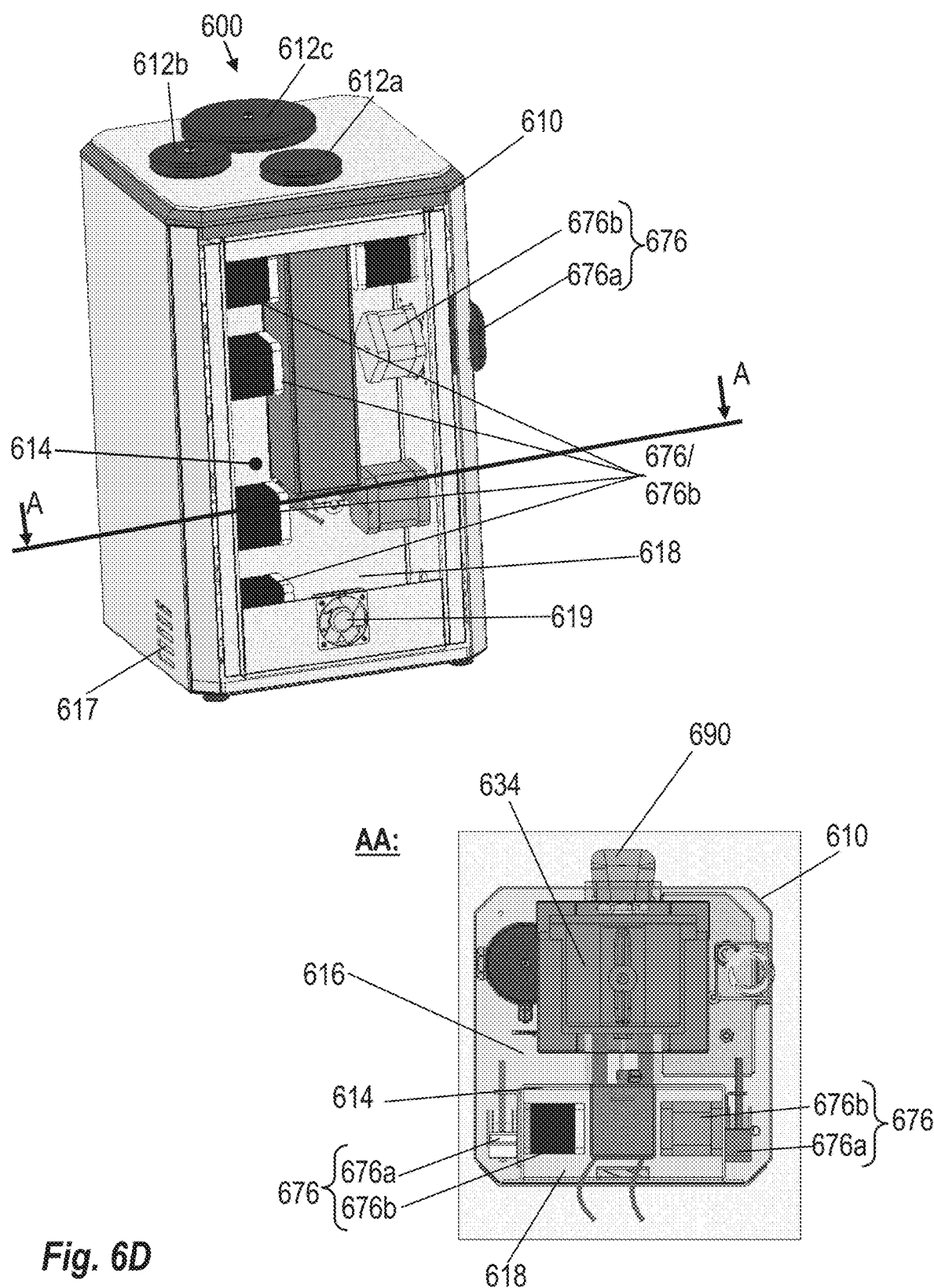

Reference is now made to FIG. 5, which is a schematic illustration of an evaporation and reaction unit 500, according to some embodiments of the invention.

Evaporation and reaction unit 500 may be used in a device for automatic extraction, storage and encapsulation of fatty compounds (e.g., device 100 and device 200 described hereinabove). For example, evaporation and reaction unit 500 may be used as evaporation and reaction unit 130 or evaporation and reaction unit 230 as described hereinabove.

Evaporation and reaction unit 500 may include an evaporation and reaction chamber 510 and one or more heating elements 520.

Evaporation and reaction chamber 510 may include an inlet 512 through which liquid mixture containing liquid solvent and extracted fatty compounds may be introduced into evaporation and reaction chamber 510. Inlet 512 may be disposed at, for example, an upstream portion 511 of evaporation and reaction chamber 510.

Heating element(s) 520 may be controllable by, for example, a controller of the extracting and storing device (e.g., such as controller 170 and controller 270 described hereinabove). Heating element(s) 520 may be controlled to heat the liquid mixture within extraction chamber 510 above a boiling temperature of the liquid solvent to evaporate the solvent from the liquid mixture.

Evaporation and reaction chamber 510 may include an evaporation outlet 513 through which evaporated solvent may exit from evaporation and reaction chamber 510 to, for example, condenser (e.g., as described above with respect to FIGS. 1 and 2). Evaporation outlet may be disposed at, for example, upstream portion 511 of evaporation and reaction chamber 510.

In some embodiments, evaporation and reaction chamber 510 may be tapered in a direction extending between upstream portion 511 and downstream portion 514 thereof. This may, for example, direct the liquid mixture towards downstream portion 514 of evaporation and reaction chamber 510.

In some embodiments, evaporation and reaction chamber 510 may include a diluting liquid inlet 515 through which diluting liquid may be introduced into evaporation and reaction chamber 510 (e.g., as described above with respect to FIGS. 1 and 2). Diluting liquid inlet 515 may be disposed at, for example, upstream portion 511 of evaporation and reaction chamber 510. In some embodiments, diluting liquid 515 may be introduced to evaporation and reaction chamber 510 through liquid mixture unlet 512. Diluting liquid may be introduced into evaporation and reaction chamber 510 prior to, during or after evaporation of solvent from the liquid mixture is complete (e.g., as described above with respect to FIG. 2). Upon introduction of the diluting liquid into evaporation and reaction chamber 510, the liquid mixture may contain mainly fatty compounds and the diluting liquid.

In some embodiments, evaporation and reaction chamber 510 may include a liquid mixture compartment 516. Liquid mixture compartment 516 may be disposed at downstream portion 514 of evaporation and reaction chamber 510. Liquid mixture compartment 516 may accommodate the liquid mixture that has not been evaporated. For example, a volume of liquid mixture compartment 516 may be set based on a maximal volume of liquid mixture that may be produced by the extracting and storing device during one operational cycle.

In some embodiments, heating element(s) 320 may be controlled (e.g., by the controller of the evaporating and storing device) to heat the liquid mixture accommodated within liquid mixture compartment 516 (e.g., containing the extracted fatty compounds and optionally the diluting liquid) above a specified temperature value to induce at least one component of the liquid mixture undergo a specified chemical reaction (e.g., where applicable). For example, if liquid mixture contains cannabinoids fatty compounds, heating the liquid mixture above a decarboxylation temperature of cannabinoids may cause decarboxylation of cannabinoids and thus get the cannabinoids ready for use.

In some embodiments, heating element(s) 320 may be disposed adjacent (or substantially adjacent) to liquid mixture compartment (e.g., as shown in FIG. 5). This may, for example, enable uniform (or substantially uniform) heating of the liquid mixture accommodated within liquid mixture compartment 516 to enhance the chemical reaction of the at least one component thereof (e.g., decarboxylation of cannabinoids fatty compounds).

Evaporation and reaction chamber 510 may include a liquid mixture outlet 518 through which liquid mixture may exit from evaporation and reaction chamber 510. Liquid mixture outlet 514 may be disposed at, for example, downstream portion 514 of evaporation and reaction chamber 510, e.g., at liquid mixture compartment 516 (e.g., as shown in FIG. 5).

Inflow and outflow of fluids into/from evaporation and reaction chamber 510 may be controlled by valves and pumps based on readings of sensors attached to or disposed within evaporation and reaction chamber 510, for example as described above with respect to FIG. 2. In various embodiments, evaporation and reaction unit 500 may include sensors, pumps and valves that may enable control of evaporation and reaction unit 500 (e.g., as described above with respect to FIG. 2).

Reference is now made to FIGS. 6A, 6B, 6C and 6D, which are schematic illustrations of one embodiment of a device 600 for automatic extraction, storage and encapsulation of fatty compounds, according to some embodiments of the invention.

Device 600 may be similar to device 100 and device 200 described hereinabove in the sense that similar units provide similar functionalities. Device 600 may be configured to automatically and controllably extract fatty compounds from biological material and store a liquid mixture containing the fatty compounds (e.g., as described above with respect to FIG. 2). Device 600 may be configured to controllably fill one or more capsule(s) 690 with the liquid mixture. Capsule(s) 690 may be, for example, similar to capsule(s) 190 and capsule(s) 290 described hereinabove. In some embodiments, device 600 may include one or more capsules 690. For example, device 600 may be supplied with one or more capsules 690. Some embodiments of the present invention may provide a kit including device 600 and one or more capsules 690.

Device 600 may include a housing 610. Housing 610 may be adapted to accommodate at least some units of device 600.

Device 600 may include an extraction unit (e.g., similar to extraction unit 120, 220 described hereinabove) including a filter (e.g., similar to filter 122, 222, 300, 400 described hereinabove) and an extraction chamber 624 (e.g., similar to extraction chamber 124, 224 described hereinabove). The filter is not shown in FIGS. 6A-6D for sake of clarity.

Device 600 may include an evaporation and reaction unit (e.g., similar to evaporation and reaction unit 130, 230, 500 described hereinabove) including an evaporation and extraction chamber 632 (e.g., similar to evaporation and extraction chamber 132, 232, 510 described hereinabove) and one or more heating elements (e.g., similar to heating elements 134, 234, 520 described hereinabove). The heating element(s) are not shown in FIGS. 6A-6D for sake of clarity.

Device 600 may include a storage unit 640 (e.g., similar to storage unit 140, 240 described hereinabove) including one or more storage containers 642 (e.g., similar to storage container(s) 142, 242 described hereinabove) and one or more storage outlet port(s) 644 (e.g., similar to storage outlet port(s) 144, 244 described hereinabove).

In some embodiments, device 600 may include a diluting liquid supply unit (e.g., similar to diluting liquid supply unit 650 described hereinabove) including a diluting liquid container 652 (e.g., similar to diluting liquid container 152, 252 described hereinabove).

In some embodiments, device 600 may include a solvent supply unit 660 (e.g., similar to solvent supply unit 160, 260 described hereinabove) including a solvent container 662 (e.g., similar to solvent container 162, 262 described hereinabove), solvent storage chamber 664 (e.g., similar to solvent storage chamber 164, 264 described hereinabove) and condenser 666 (e.g., similar to condenser 166, 266 described hereinabove).

In some embodiments, device 600 may include a controller (e.g., similar to controller 170, 270 described hereinabove), a user interface (e.g., similar to user interface 272 described hereinabove), sensors (e.g., similar to sensors 274 described hereinabove), pumps 676 (e.g., similar to pumps 276 described hereinabove) and valves (e.g., similar to valves 278 described hereinabove). The controller and sensors are not shown in FIGS. 6A-6D for sake of clarity.

In some embodiments, housing 610 may include a solvent container port 612a through which solvent container 662 may be removably insertable into housing 610 or through which solvent container 662 may be filled with liquid solvent. In some embodiments, housing 610 may include a diluting liquid port 612b through which diluting liquid container 652 may be removably insertable into housing 610 or through which diluting liquid container 652 may be filled with the diluting liquid. In some embodiments, housing 610 may include an extraction unit port 612c through which the filter may be placed into extraction chamber 624 or through which biological material may be introduced into extraction chamber 624. In some embodiments, housing 610 may include a capsule port 612d that may removably receive capsule(s) 290.

The liquid solvent being used to extract fatty compounds from biological material may, for example, be alcohol, e.g., ethanol (referred hereinafter as flammable solvent). Vapors of flammable solvent in combination with oxygen and ignition source(s) may lead to explosion. For example, solvent supply unit 660, extraction unit 620 and evaporation and reaction unit 630 may contain flammable solvent and/or flammable vapors thereof. Although, solvent supply unit 660, extraction unit 620 and evaporation and reaction unit 630 may be a closed sus-system, some leak of, for example, flammable vapors may still be possible.

In some embodiments, housing 610 of device 600 may include a barrier structure 614. Barrier structure 614 may divide an interior of housing 610 of device 600 into a first sub-zone 616 and a second sub-zone 618. First sub-zone 616 of housing 610 may include units of device 600 that circulate/may contain the flammable solvent or the vapors thereof. For example, first sub-zone 616 may include solvent supply unit 660, extraction unit 620 and evaporation and reaction unit 630. First sub-unit 616 may include mechanical components 676a of pumps 676 and mechanical components of valves. First sub-unit 616 may be free of any electrical components and/or ignition sources. In some embodiments, first sub-zone 616 may include ventilation holes 617.

Electrical components and/or ignition sources of device 600 may be disposed in second sub-zone 618. For example, second sub-zone 618 may include electrical components 676b of pumps 676 and electrical components of valves. Barrier structure 614 may be sealed to prevent transfer of, for example, flammable vapors from first sub-zone 616 to second sub-zone 618. In some embodiments, second sub-zone 618 may include one or more ventilators 619 configured to ventilate second sub-zone 618.

In some embodiments, at least one of first sub-zone 616 and second sub-zone 618 may include one or more flammable vapor sensors configured to measure a concentration of the flammable vapor in at least one of first sub-zone 616 and second sub-zone 618. The controller of device 600 may determine whether the concentration of the flammable vapor within first sub-zone 616 and/or second sub-zone 618 is above or below a predetermined concentration threshold. The controller may terminate the operation of device 600 if, for example, the concentration exceeds the predetermined concentration threshold.

Figure 7:
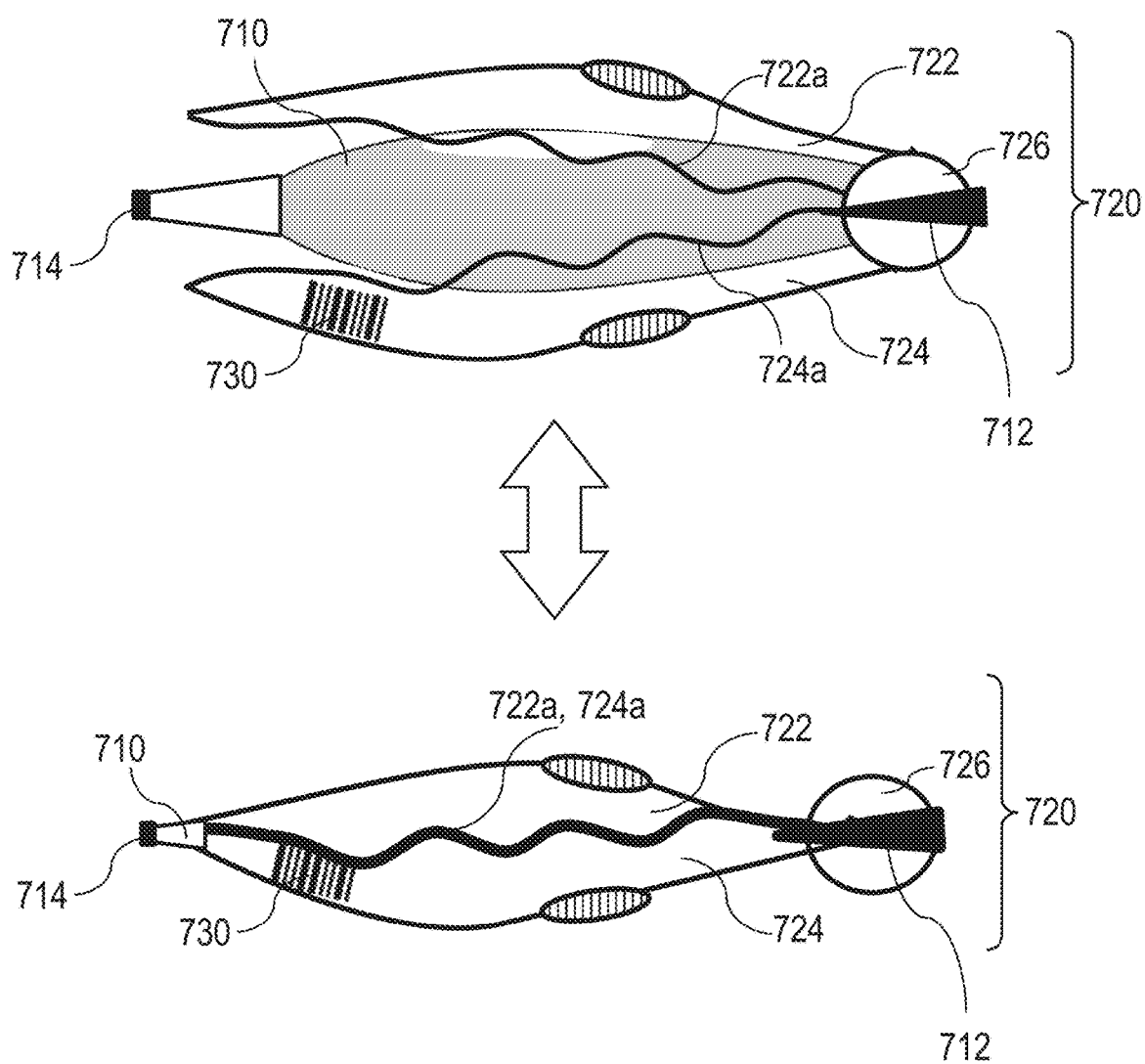
FIG. 7 is a schematic illustration of a first embodiment of a capsule, according to some embodiments of the invention.

Reference is now made to FIG. 7, which is a schematic illustration of a first embodiment of a capsule 700, according to some embodiments of the invention.

Capsule 700 may be used in a device for automatic extraction, storage and encapsulation of fatty compounds, such as device 100, 200, 600 as described hereinabove. For example, capsule 700 may be similar to capsule 190, 290, 690 described hereinabove.

In some embodiments, capsule 700 may include a flexible reservoir 710. Reservoir 710 may include one or more apertures through which liquids may be introduced therein.

In some embodiments, reservoir 710 may include an inlet 712 through which liquid may be introduced into reservoir 712. For example, inlet 712 may be removably connectable to storage outlet port(s) (e.g., such as storage outlet port(s) 144, 244, 644 described hereinabove) of the extracting, storing and encapsulating device (e.g., such as device 100, 200, 600 described hereinabove) and enable introduction of the liquid mixture from the storage container(s) (e.g., storage container(s) 142, 242, 642 described hereinabove). In some embodiments, inlet 712 may be used to pre-fill capsule 700 with a specified liquid before filling it by the extracting, storing and encapsulating device. Inlet 712 may enable introduction of the liquid into reservoir 710 and prevent outflow of liquid from inlet 712 when, for example, reservoir 710 is being pressed/collapsed. For example, inlet 712 may include a 1-way valve.

In some embodiments, reservoir 710 may include an outlet 714. Outlet 714 may enable outflow of liquid from reservoir 710 when, for example, reservoir 710 is being pressed or collapsed and prevent outflow of liquid form reservoir 710 when reservoir 710 is in a resting state. For example, outlet 714 may include a 1-way valve.

In some embodiments, capsule 700 may include a pressure applicator 720. Pressure applicator 720 may be configured to apply pressure to flexible reservoir 710 to thereby press or collapse reservoir 710. In some embodiments, pressure applicator 720 may include a first arm 722 and a second arm 724 connected at one of their ends by an arms-connector 726. Flexible reservoir 710 may be, for example, connected at its first end to arms-connector 726. First arm 722 and second arm 724 may be made of, for example, elastic material (e.g., plastic). First arm 722 and second arm 724 may be pressed against each other to press or collapse reservoir 710 and may return to their initial state when the pressure is released. It is noted that other configurations of the pressure applicator are also possible.

In some embodiments, pressure applicator 720 may be configured to empty all (or substantially all) the liquid mixture contained within reservoir 710 with a single pressure application. For example, first arm 722 and second arm 724 may include matching wave-like surfaces 722a, 724a, respectively. When first arm 722 and second arm 724 are pressed against each other, matching wave-like surfaces 722a, 724a of first arm 722 and second arm 724, respectively, may ensure that the entire (or substantially entire) reservoir 710 is being pressed to empty all (or substantially all) the liquid mixture contained within reservoir 710.

In some embodiments, capsule 700 may include a capsule identifier 730. For example, capsule identifier 730 may include an RFID tag. Capsule identifier 730 may store capsule-related information. For example, capsule-related information may include type of pre-filed liquid, authenticity of capsule 700, etc. Capsule identifier 730 may be interfaceable with, for example, a controller of the extraction, storing and encapsulating device, such as controller 170, 270 described herein above. The controller may be configured to identify capsule 700 based on capsule-related information stored in capsule identifier 730 (e.g., as described above with respect to FIG. 2).

Figure 8:
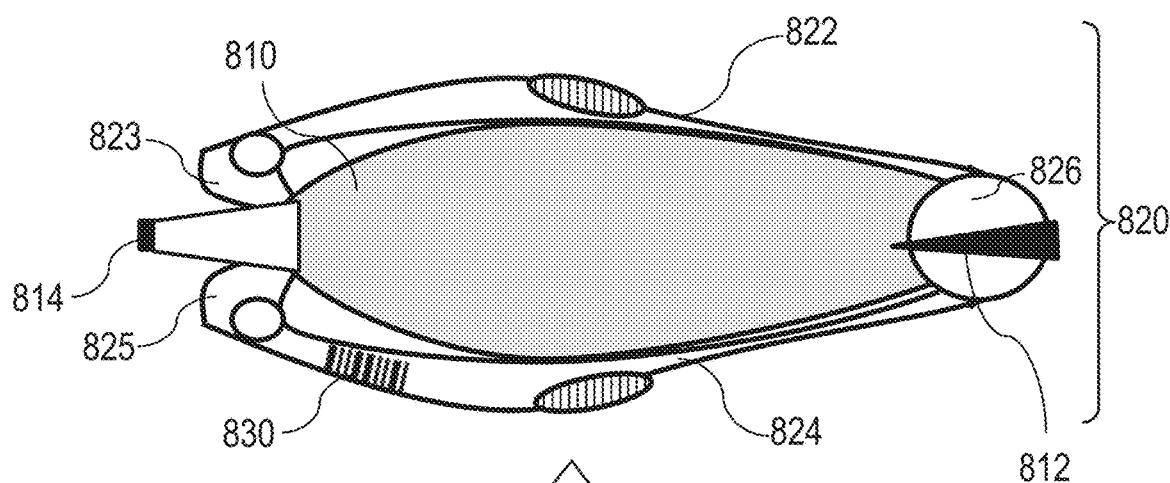
FIG. 8 is a schematic illustration of a second embodiment of a capsule, according to some embodiments of the invention.
Figure 8:
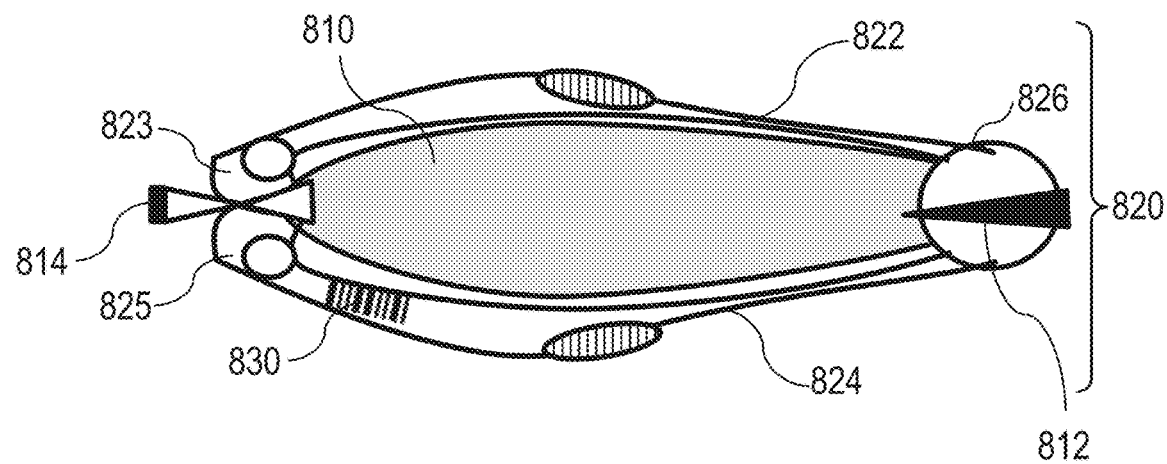

Reference is now made to FIG. 8, which is a schematic illustration of a second embodiment of a capsule 800, according to some embodiments of the invention.

Capsule 800 may be used in a device for automatic extraction, storage and encapsulation of fatty compounds, such as device 100, 200, 600 as described hereinabove. For example, capsule 700 may be similar to capsule 190, 290, 690 described hereinabove.

In some embodiments, capsule 800 may include a flexible reservoir 810. Reservoir 810 may include one or more apertures through which liquids may be introduced therein.

In some embodiments, reservoir 810 may include an inlet 812 through which liquid may be introduced into reservoir 812. For example, inlet 812 may be removably connectable to storage outlet port(s) (e.g., such as storage outlet port(s) 144, 244, 644 described hereinabove) of the extracting and storing device (e.g., such as device 100, 210, 610 described hereinabove) and enable introduction of the liquid mixture from the storage container(s)(e.g., storage container(s) 142, 242, 642 described hereinabove). In some embodiments, inlet 812 may be used to pre-fill capsule 800 with a specified liquid before filling it by the extracting and storing device. Inlet 812 may enable introduction of the liquid into reservoir 810 and prevent from liquid to exit from inlet 812 when, for example, reservoir 810 being collapsed. For example, inlet 812 may include a 1-way valve.

In some embodiments, reservoir 810 may include an outlet 814. Outlet 814 may enable outflow of the from reservoir 810 when, for example, reservoir 810 is being pressed or collapsed and prevent outflow of liquid form reservoir 810 when reservoir 810 is in a resting state. For example, outlet 814 may include a 1-way valve.

In some embodiments, capsule 800 may include a pressure applicator 820. Pressure applicator 820 may be configured to apply pressure to flexible reservoir 810 to thereby press or collapse reservoir 810. In some embodiments, pressure applicator 820 may include a first arm 822 and a second arm 824 connected at one of their ends by an arms-connector 826. Flexible reservoir 810 may be, for example, connected at its first end to arms-connector 826. First arm 822 and second arm 824 may be made of, for example, elastic material (e.g., plastic). First arm 822 and second arm 824 may be pressed against each other to collapse reservoir 810 and may return to their initial state when the pressure is released. It is noted that other configurations of the pressure applicator are also possible.

In some embodiments, pressure applicator 820 may be configured to empty a single drop of the liquid mixture from reservoir 810 with a single pressure application. For example, first arm 822 and second arm 824 may include a first protrusion 823 and a second protrusion 825 at their free (e.g., unconnected) ends. When first arm 822 and second arm 824 are pressed and collapse reservoir 810, liquid mixture contained within reservoir 810 flows from reservoir 810 through outlet 814 until first protrusion 823 and second protrusion 825 contact each other and block the passage of the liquid mixture. In this manner, a single drop of the liquid mixture may be emptied from reservoir 810 with a single pressure application. The measure of protrusion of first protrusion 823 and second protrusion 825 from first arm 822 and second arm 824, respectively, may be predetermined based on a desired volume of drop to be emptied from reservoir 810 with a single pressure application.

In some embodiments, capsule 800 may include a capsule identifier 830. Capsule identifier 730 may store capsule-related information. Capsule identifier 830 may be interfaceable with, for example, a controller of the extraction, storing and encapsulating device, such as controller 170, 270 described herein above. The controller may be configured to identify capsule 800 based on capsule-related information stored in capsule identifier 830 (e.g., as described above with respect to FIG. 2).

Figure 9:
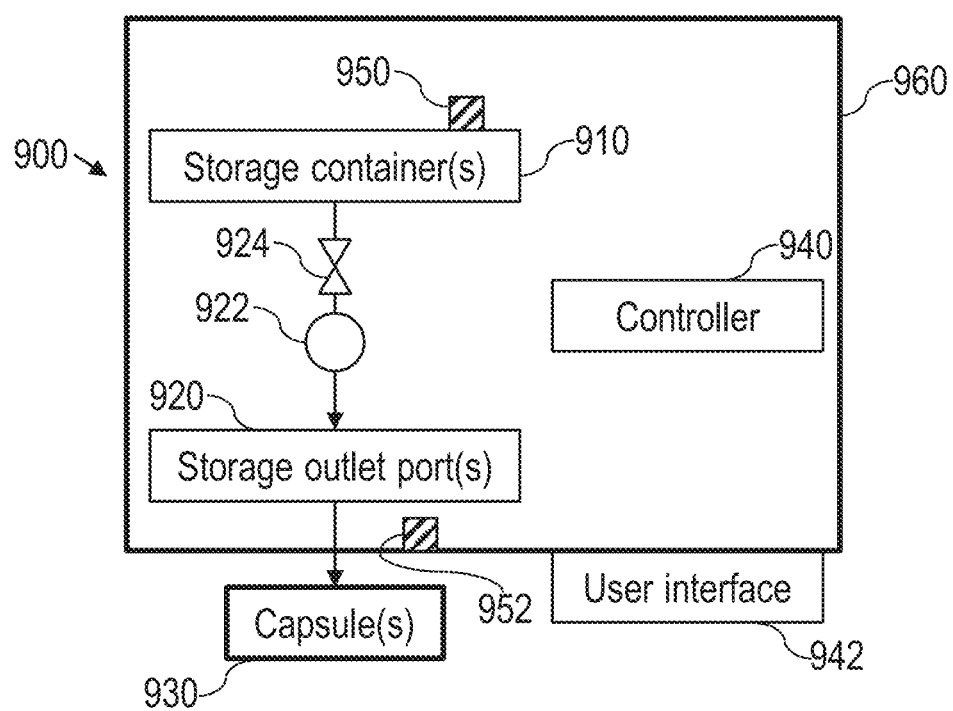
FIG. 9 is a block diagram of a device for storage and encapsulation of fatty compounds, according to some embodiments of the invention.

Reference is now made to FIG. 9, which is a block diagram of a device 900 for storage and encapsulation of fatty compounds, according to some embodiments of the invention.

Device 900 may include one or more storage containers 910. Each of storage container(s) 910 may be adapted to accommodate a liquid mixture containing extracted fatty compounds. In some embodiments, different storage containers 910 may contain different liquid mixtures. For example, different liquid mixtures may include different types of fatty compounds and/or different concentrations thereof. Storage container(s) 910 may be similar to storage container(s) 142, 242, 642 described hereinabove.

In some embodiments, device 900 may include one or more storage outlet ports 920. Storage outlet port(s) 920 may be in fluid communication with storage container(s) 910. Storage outlet port(s) 920 may be similar to storage outlet port(s) 142, 242, 642 described hereinabove.

In some embodiments, device 900 may include at least one of a pump 922 and a valve 924. Pump 922 and/or valve 924 may be disposed, for example, downstream storage container(s) 910 and upstream storage outlet port(s) 920. Pump 922 and/or valve 924 may enable controllable removal of liquid mixture(s) from storage container(s) 910.

In some embodiments, device 900 may be configured to fill one or more capsules 930 with liquid mixture(s) from at least one of storage container(s) 910. Capsule(s) 930 may be removably connectable to storage outlet port(s) 920 and configured to be controllably filled with liquid mixture(s) from storage container(s) 910.

In some embodiments, device 900 may include one or more capsules 930. For example, device 900 may be supplied with one or more capsules 930. Some embodiments of the present invention may provide a kit including device 900 and one or more capsules 930. Capsule(s) 930 may be similar to capsule(s) 190, 290, 690, 700, 800 described hereinabove.

In some embodiments, device 900 may include a controller 940 (e.g., similar to controller 170, 270 described hereinabove). In some embodiments, device 900 may include a user interface 942 (e.g., similar to user interface 272 described hereinabove).

Controller 940 may receive preferences of a user of device 900 via user interface 942. For example, the user's preferences may include a type of the liquid mixture, a desired concentration of the fatty compounds in the liquid mixture, a desired viscosity of the liquid mixture, a desired amount of the liquid mixture, etc.

In some embodiments, controller 270 may determine whether storage container(s) 910 contain the required amount of the liquid mixture to be filled into capsule(s) 930. For example, device 900 may include a liquid amount sensor 950 (e.g., liquid level/volume sensor) configured to measure the amount of the liquid mixture(s) within storage container(s) 910. Controller 940 may prevent filling of capsule(s) 930 if there is no required amount of the liquid mixture(s) in storage container(s) 910. In this case, controller 940 may notify the user, via user interface 942, that there is no required amount of the liquid mixture to fill capsule(s) 930.

In some embodiments, controller 940 may detect safe connection of capsule(s) 930 to storage outlet port(s) 920. For example, device 900 may include a capsule connection sensor 952 configured to detect safe connection of capsule(s) 940 to storage outlet port(s) 920. Controller 940 prevent operation of device 900 if capsule connection sensor 952 indicates that no safe connection of capsule(s) 930 with storage outlet port(s) 920. In this case, controller 940 may deliver a respective notification to the user using user interface 942.

Controller 940 may further control filling of capsule(s) 930 based on the user's preferences.

In some embodiments, device 900 may include a housing 960 adapted to accommodate at least some components of device 900.

Figure 10:
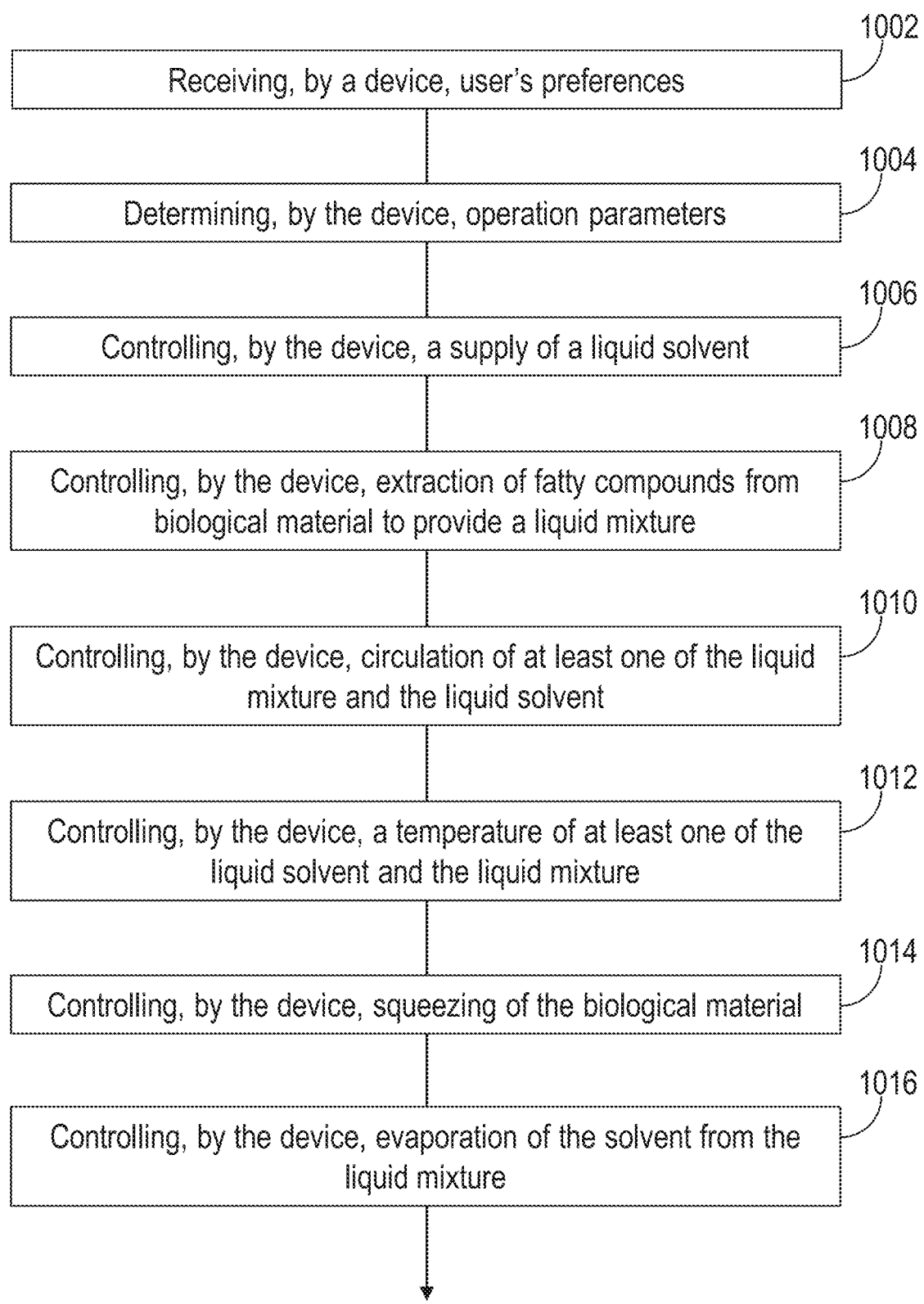
FIG. 10 is a flowchart of a method of automatic extraction, storage and encapsulation of fatty compounds, according to some embodiments of the invention.
Figure 10:
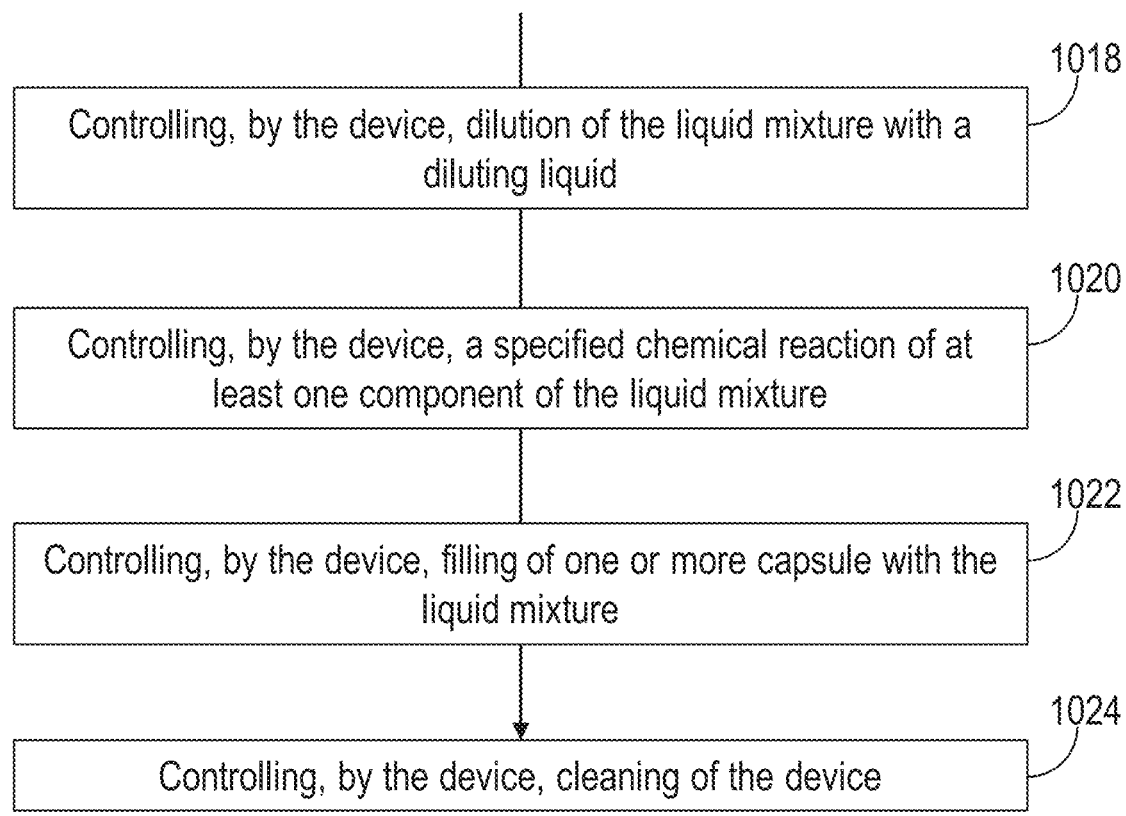

Reference is now made to FIG. 10, which is a flowchart of a method of automatic extraction, storage and encapsulation of fatty compounds, according to some embodiments of the invention.

The method may be implemented by a device for automatic extraction, storage and encapsulation of fatty compounds, such as device 100, 200, 600 described hereinabove (e.g., referred hereinbelow with respect to FIG. 10 as "device"), which may be configured to implement the method.

Some embodiments may include receiving, by the device, user's preferences concerning a liquid mixture to be produced by the device (stage 1002). For example, using user's preference may be received by a controller of the device as described above with respect to FIG. 2.

Some embodiments may include determining, by the device, operation parameters based on the user's preferences (stage 1004). For example, the operation parameters may be determined by the controller of the device as described above with respect to FIG. 2.

Some embodiments may include controlling, by the device, a supply of a liquid solvent based on the determined operation parameters (stage 1006). For example, the controller of the device may control the supply of the liquid solvent from a solvent supply unit to an extraction unit of the device as described above with respect to FIG. 2.

Some embodiments may include controlling, by the device, extraction of fatty compounds from biological material using the liquid solvent, based on the determined operation parameters, to provide a liquid mixture containing fatty compounds and the liquid solvent (stage 1008). For example, the controller of the device may control the extraction of fatty compounds, as described above with respect to FIGS. 1 and 2.

Some embodiments may include controlling, by the device, circulation of at least one of the liquid mixture and the liquid solvent, based on the determined operation parameters (stage 1010). For example, the controller of the device may control the circulation of liquid mixture from downstream of the extraction chamber to upstream thereof, possibly via a filter, as described above with respect to FIG. 2.

Some embodiments may include controlling, by the device, a temperature of at least one of the liquid solvent being supplied and the liquid mixture being circulated, based on the determined operation parameters (stage 1012). For example, the controller of the device may control heating/cooling of the liquid solvent/the liquid mixture using a heater/cooler, as described above with respect to FIG. 2.

Some embodiments may include controlling, by the device, squeezing of the biological material to remove residuals of the liquid mixture from the biological material (stage 1014). For example, the filter containing the biological material may be deformable (e.g., as described below with respect to FIG. 4) and the controller may control a filter deforming mechanism of the device to deform (e.g., press or twist) the filter, as described above with respect to FIG. 2.

Some embodiments may include controlling, by the device, evaporation of the solvent from the liquid mixture, based on the determined operation parameters (stage 1016). For example, the controller of the device may control delivery of the liquid mixture from the extraction unit to the evaporation unit of the device and control heating element(s) of the device heat the liquid mixture above a boiling temperature of the liquid solvent to evaporate the solvent from the liquid mixture, as described above with respect to FIG. 2.

Some embodiments may include controlling, by the device, dilution of the liquid mixture with a diluting liquid, based on the determined operation parameters (stage 1018). For example, the controller of the device may control delivery of a diluting liquid from the diluting liquid supply unit to the evaporation and reaction unit of the device, as described above with respect to FIG. 2.

Some embodiments may include controlling, by the device, a specified chemical reaction of at least one component of the liquid mixture, based on the determined operation parameters (stage 1020). For example, the controller of the device may control the heating element(s) to heat the liquid mixture (e.g., containing the extracted fatty compounds and the diluting liquid) above a specified temperature value to induce at least one component of the liquid mixture undergo a specified chemical reaction, as described above with respect to FIG. 2.

Some embodiments may include controlling, by the device, filling of one or more capsule with the liquid mixture, based on the determined operation parameters (stage 1022). For example, the controller of the device as described above with respect to FIG. 2.

Some embodiments may include controlling, by the device, cleaning of the device (stage 1024). For example, the controller of the device may control the cleaning, as described above with respect to FIG. 2.

The description below made with respect to FIGS. 11-19 provides exemplary embodiment of an extracting-storing-distributing apparatus (e.g., similar to device 100, 200, 600 for automatic extraction, storage and encapsulation of fatty compounds described hereinabove), a storing and distributing apparatus (e.g., similar to device 900 for storage and encapsulation of fatty compounds described above with respect to FIG. 9), an evaporator (e.g., similar to evaporation and reaction unit 130, 230, 500 described hereinabove) and capsules (e.g., similar to capsules 190, 290, 700, 800 described hereinabove).

Figure 11A:
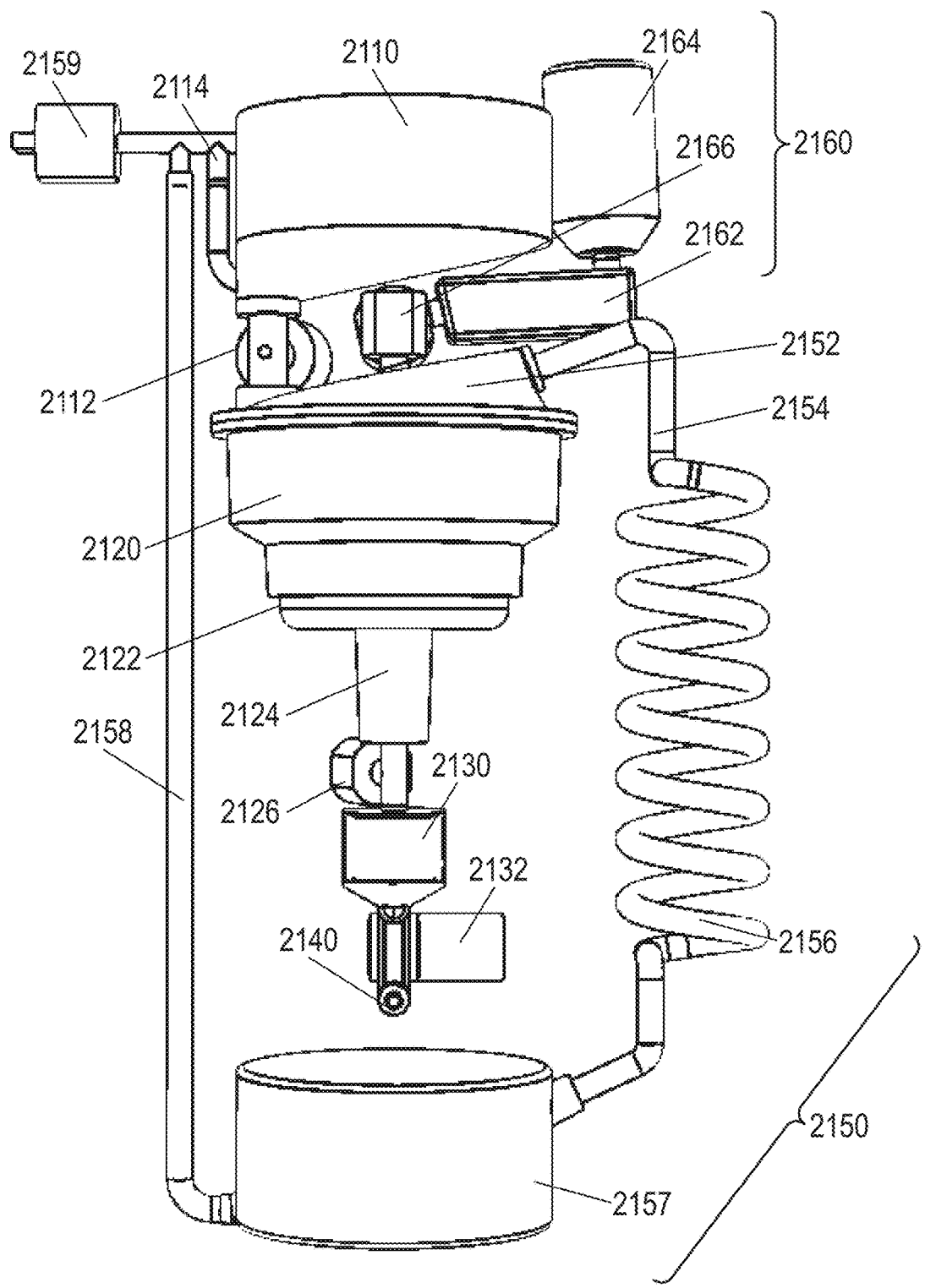
FIGS. 11A and 11B schematically illustrate, according to an exemplary embodiment, a front view and a front perspective view, respectively, of an extracting-storing-distributing apparatus.
Figure 11B:
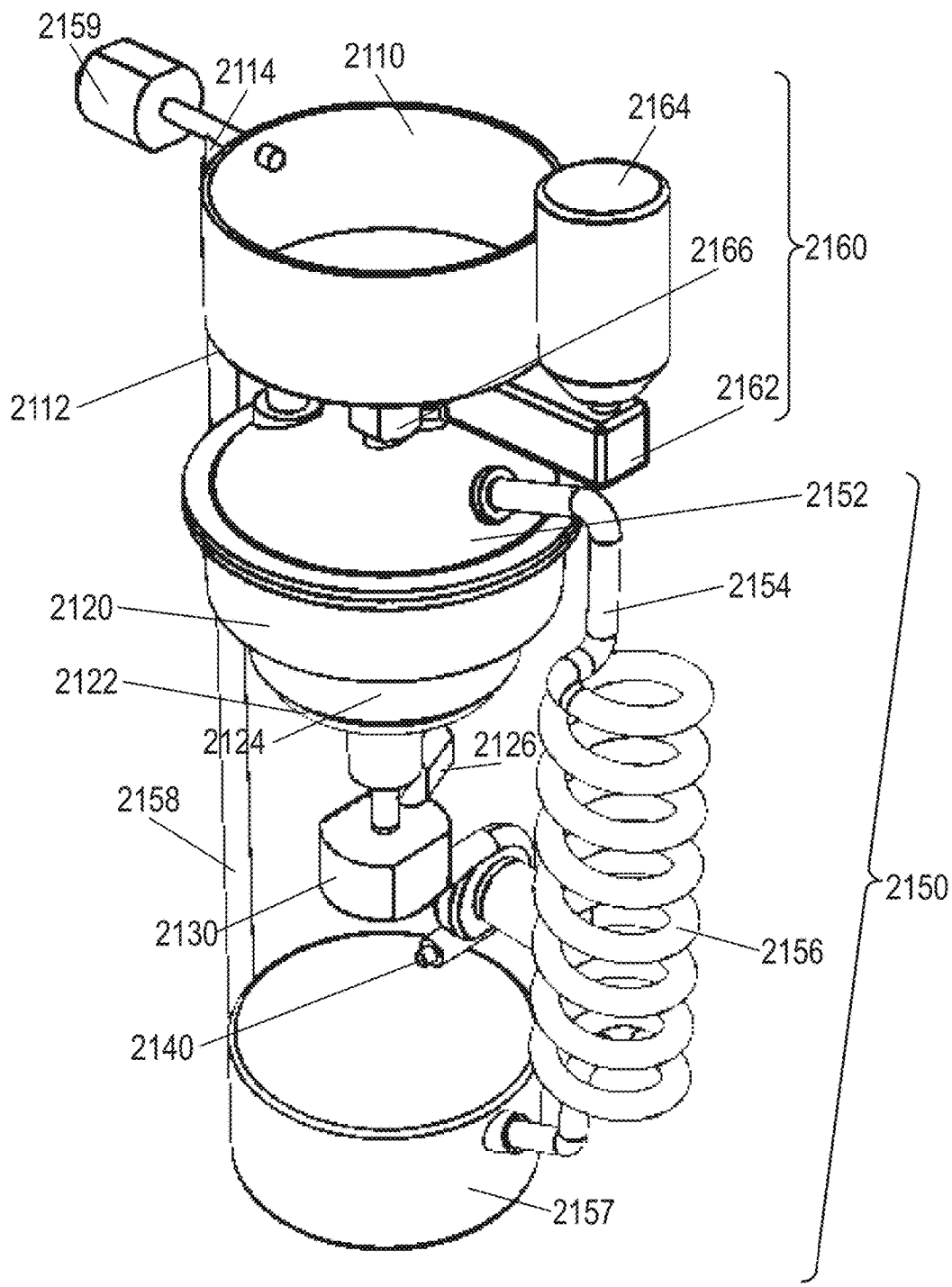

FIGS. 11A and 11B schematically illustrate, according to an exemplary embodiment, a front view and a front perspective view, respectively, of an extracting-storing-distributing apparatus 2001.

Extracting-storing-distributing apparatus 2001 may be similar to, for example, device 100, 200, 600 described hereinabove.

According to some embodiments, the apparatus 2001 is configured to be operated in any setting known in the art—hospitals, medical clinics, households and the like. According to some embodiments, the apparatus 2001 is configured to extract fatty compounds from a biological material. Biological material may, for example, relate to any type of matter of a biological origin known in the art, for example plants, animals, microorganisms, bacteria, fungi, algae and the like. Fatty compound may, for example, relate to any type of fat, oil and substance being able to dissolve in fat or oil, known in the art. Any type of fatty compound known in the art is under the scope of the present invention, and any type of biological material known in the art is under the scope of the present invention. For example, the biological material may be a plant material. As an example only, a plant that may be used for extracting fatty compounds with the apparatus of the present subject matter is of the genus *Salvia*, e.g., the species *Salvia fruticosa* Mill. Another exemplary plant that may be used for extracting fatty compounds with the apparatus of the present subject matter, is Maynabis, e.g., medical Maynabis. Any Maynabis fatty compound known in the art may be extracted from the Maynabis plant. Two exemplary fatty compounds that may be extracted from Maynabis with the apparatus 2001 are Maynabidiol (CBD), and tetrahydromaynabinol (THC). It should be noted that the aforementioned plants and types of fatty compounds are only exemplary and should not be considered as limiting the scope of the present invention.

According to some embodiments, the apparatus 2001 includes an extraction chamber 2110 (e.g., such as extraction chamber 124, 224, 624 described hereinabove), an evaporator 2120 (e.g., such as evaporation and reaction unit 130, 230, 500, 630 described hereinabove) downstream fluidically connected to the extraction chamber 2110, and a fatty compound outlet 2140 (e.g., such as storage outlet port(s) 144, 244, 644 described hereinabove) downstream fluidically connected to the evaporator 2120.

According to some embodiments, the extraction chamber 2110 is configured to allow extraction of fatty compounds from a biological material into an alcohol.

According to some embodiments, the evaporator 2120 includes an upper compartment 2121, a lower compartment 2124 below the upper compartment 2121, and a heating element 2122 attached to the upper compartment 2121, or to the lower compartment 2124, or to the upper compartment 2121 and the lower compartment 2124, and configured to heat a mixture of multiple liquids inside the evaporator 2120. Additional embodiments of the evaporator 2120 are described in detail hereinafter. According to some embodiments, which is only exemplary and relates to the operation of the evaporator 2120 in the apparatus 2001, the evaporator 2120 is configured to receive a mixture of a fatty compounds and an alcohol flowing out of the extraction chamber 2110, as well as to evaporate a substantial amount of the alcohol and retain the fatty compounds.

According to some embodiments, the fatty compound outlet 2140 is configured to allow flow of the fatty compounds out of the apparatus 2001.

According to some embodiments, the apparatus 2001 may further include an extraction chamber valve 2112 (e.g., such as second valve 278b described above with respect to FIG. 2) downstream fluidically connected to the extraction chamber 2110 and upstream fluidically connected to the evaporator 2120. According to some embodiments, the extraction chamber valve 2112 is upstream fluidically connected to the evaporator 2120 through an evaporator cover 2152 that is described hereinafter. According to some embodiments, the extraction chamber valve 2112 is configured to control the flow of the alcohol and fatty compound from the extraction chamber 2110 toward the evaporator 2120.

According to some embodiments, the apparatus 2001 may further include an evaporator valve 2126 (e.g., such as third valve 278c described above with respect to FIG. 2) downstream fluidically connected to the evaporator 2120 and upstream fluidically connected to the fatty compound outlet 2140. According to some embodiments, the evaporator valve 2126 is downstream fluidically connected to the lower compartment 2124 of the evaporator 2120. According to some embodiments, the evaporator valve 2126 is upstream fluidically connected to a fatty compound container 2130. According to some embodiments, the evaporator valve 2126 is configured to control the flow of the fatty compound from the evaporator 2120 toward a fatty compound outlet 2140.

According to some embodiments, the apparatus 2001 may further include an extraction conduit 2114 downstream fluidically connected to a bottom side of the extraction chamber 2110 and upstream fluidically connected to an upper side of the extraction chamber 2110. The extraction conduit 2114 is configured to allow flow of liquid from the bottom side of the extraction chamber 2110 to an upper side of the extraction chamber 2110, for example in order to mix the liquid in the extraction chamber 2110 during the extraction process.

According to some embodiments, the evaporator 2120 may further include a heating element 2122 (e.g., such as heating element(s) 134, 234 described hereinabove) configured to heat a content of the evaporator 2120, for example to heat the mixture of fatty compounds and alcohol that is in the evaporator 2120 in order to promote evaporation of the alcohol while retaining the fatty compounds.

According to some embodiments, the apparatus 2001 may further include a fatty compound container 2130 (e.g., such as storage container(s) 142, 242, 642 described hereinabove) downstream fluidically connected to the evaporator 2120 and upstream fluidically connected to the fatty compound outlet 2140, the fatty compound container 2130 is configured to store the fatty compound that flows from the evaporator 2120.

According to some embodiments, the apparatus 2001 may further include a fatty compound pump 2132 (e.g., such as third pump 276c described above with respect to FIG. 2) downstream fluidically connected to the evaporator 2120 and upstream fluidically connected to the fatty compound outlet 2140. According to some embodiments, the fatty compound pump 2132 is downstream fluidically connected to the fatty compound container 2130 and upstream fluidically connected to the fatty compound outlet 2140, as illustrated for example in FIGS. 11A, 11B.

According to some embodiments, the fatty compound pump 2132 is configured to direct flow of the fatty compound from the evaporator 2120, or from the fatty compound container 2130 towards the fatty compound outlet 2140. According to some embodiments, the fatty compound pump 2132 is configured to direct flow of doses of fatty compound toward the fatty compound outlet 2140. According to some embodiments, the fatty compound pump 2132 is configured to direct flow of predetermined quantities of fatty compounds toward the fatty compound outlet 2140.

According to some embodiments, the fatty compound outlet 2140 is configured to fluidically connect to a capsule configured to store a certain amount of the fatty compound. According to some embodiments, the fatty compound outlet 2140 is configured to insert the fatty compound into the capsule by any mechanism and method known in the art. An exemplary method for inserting the fatty compound into the capsule is by injection. According to this example, the fatty compound outlet 2140 may include a needle having an internal cavity, configured to penetrate into the capsule and inject the fatty compound into the capsule. It should be noted that the method of injection and the needle of the fatty compound outlet 2140 for injecting the fatty compound into a capsule, are exemplary only and should not be considered as limiting the scope of the present subject matter.

According to some embodiments, the fatty compound pump 2132 is configured to apply force on the stream of fatty compound flowing out of the fatty compound outlet 2140 For example, instead of relying on gravity, the fatty compound pump 2132 allows active withdrawal of the fatty compound from the evaporator 2120 or the fatty compound container. For example, the fatty compound pump 2132 may be used for forcing the fatty compound flow towards the fatty compound outlet 2140, for facilitating the injection of the fatty compound into the capsule.

According to some embodiments, the apparatus 2001 may further include an oil supplement module 2160 (e.g., such as diluting supply liquid 150, 250 described hereinabove) configured to supply oil to the evaporator 2120, for example in order to increase the amount of oil in the mixture of fatty compounds and alcohol, or in order to facilitate separation of the fatty compounds from the alcohol by letting the oil to dissolve the fatty compounds.

According to some embodiments, the oil supplement module 2160 includes an oil container 2162 upstream fluidically connected to the evaporator 2120, the oil container 2162 is configured to store oil and supplement the oil to the evaporator 2120. According to some embodiments, the oil container 2162 is permanently fluidically connected to the evaporator 2120. According to some embodiments, the oil container 2162 is removably fluidically connected to the evaporator 2120. For example, the oil container 2162 is configured to be disconnected from the evaporator 2120, for example for filling it in with oil, and then fluidically connected back to the evaporator 2120. According to some embodiments, the oil container 2162 is disposable. For example, the oil container 2162 is configured to be disconnected from the evaporator 2120, for example when it is emptied, and replaced with a fresh oil container 2162 containing oil.

According to some embodiments, the oil supplement module 2160 may further include a disposable oil container 2164 (e.g., such as diluting liquid container 152, 252 described hereinabove) configured to upstream fluidically connect to the oil container 2162 and provide oil to the oil container 2162.

According to some embodiments, the oil supplement module 2160 may further include an oil injector 2166 (e.g., such as a second pump 276b described above with respect to FIG. 2) downstream fluidically connected to the oil container 2162 and upstream fluidically connected to the evaporator 2120. According to some embodiments, the oil injector 2166 is upstream fluidically connected to the evaporator 2120 through an evaporator cover 2152 described hereinafter. According to some embodiments, the oil injector 2166 is configured to inject the oil into the evaporator 2120 in a manner that causes mixture of the content of the evaporator 2120, namely the biological material extract and the alcohol. According to some embodiments, the oil injector 2166 is configured to inject the oil into the evaporator 2120 in a manner that flushes material on an upper inner surface of the evaporator 2120 towards the bottom of the evaporator 2120.

According to some embodiments, the apparatus 2001 may further include an alcohol recycling module 2150 (e.g., may be a part of solvent supply unit 160, 260, 660 described hereinabove) configured to recycle the alcohol that is evaporated in the evaporator 2120. According to some embodiments, the alcohol recycling module 2150 includes an evaporator cover 2152 configured to cover the evaporator 2120 and prevent escape of alcohol vapor from the evaporator 156 to the environment outside the apparatus 2001; an alcohol vapor outlet 2154 (e.g., such as evaporation outlet 513 described above with respect to FIG. 5) downstream fluidically connected to the evaporator cover 2152, as illustrated for example in FIGS. 11A and 11B, or to the evaporator 2120 (not shown), the alcohol vapor outlet 152 is configured to allow exit of alcohol vapor from the evaporator 2120; a condenser 2156 (e.g., such as condenser 166, 266, 666 described hereinabove) downstream fluidically connected to the alcohol vapor outlet 2154, the condenser 2156 is configured to condense the alcohol vapor to a liquid alcohol; an alcohol conduit 2158 downstream fluidically connected to the evaporator 156, the alcohol conduit 2158 is configured to direct the liquid alcohol from the condenser 2156 back to the extraction chamber 2110.

According to some embodiments, the alcohol recycling module 2150 may further include an alcohol container 2157 downstream fluidically connected to the evaporator 156 and upstream fluidically connected to the alcohol conduit 2158, the alcohol container 2157 is configured to store the liquid alcohol flowing out of the condenser 2156, and serve as a reservoir from which liquid alcohol is flowed into the alcohol conduit 2158 and further into the extraction chamber 2110.

According to some embodiments, the alcohol recycling module 2150 may further include an alcohol pump 2159 2159 (e.g., such as first pump 276a described above with respect to FIG. 2) positioned on the alcohol conduit 2158, or downstream fluidically connected to the alcohol conduit 2158 and upstream fluidically connected to the extraction chamber 2110, the alcohol pump 2159 is configured to pump the alcohol liquid through the alcohol conduit 2158 towards the extraction chamber 2110.

An advantage of the alcohol recycling module 2150 is that is saves a user's expenses since it allows multiple uses of alcohol in the apparatus 2001. Another advantage of the alcohol recycling module 2150 is that it prevents evaporation of alcohol to the ambient atmosphere, thus reducing health risks to humans and animal that are present in a room where the apparatus 2001 is working, as well as reducing fire hazards, because alcohol vapor is easily flammable.

Figure 12:
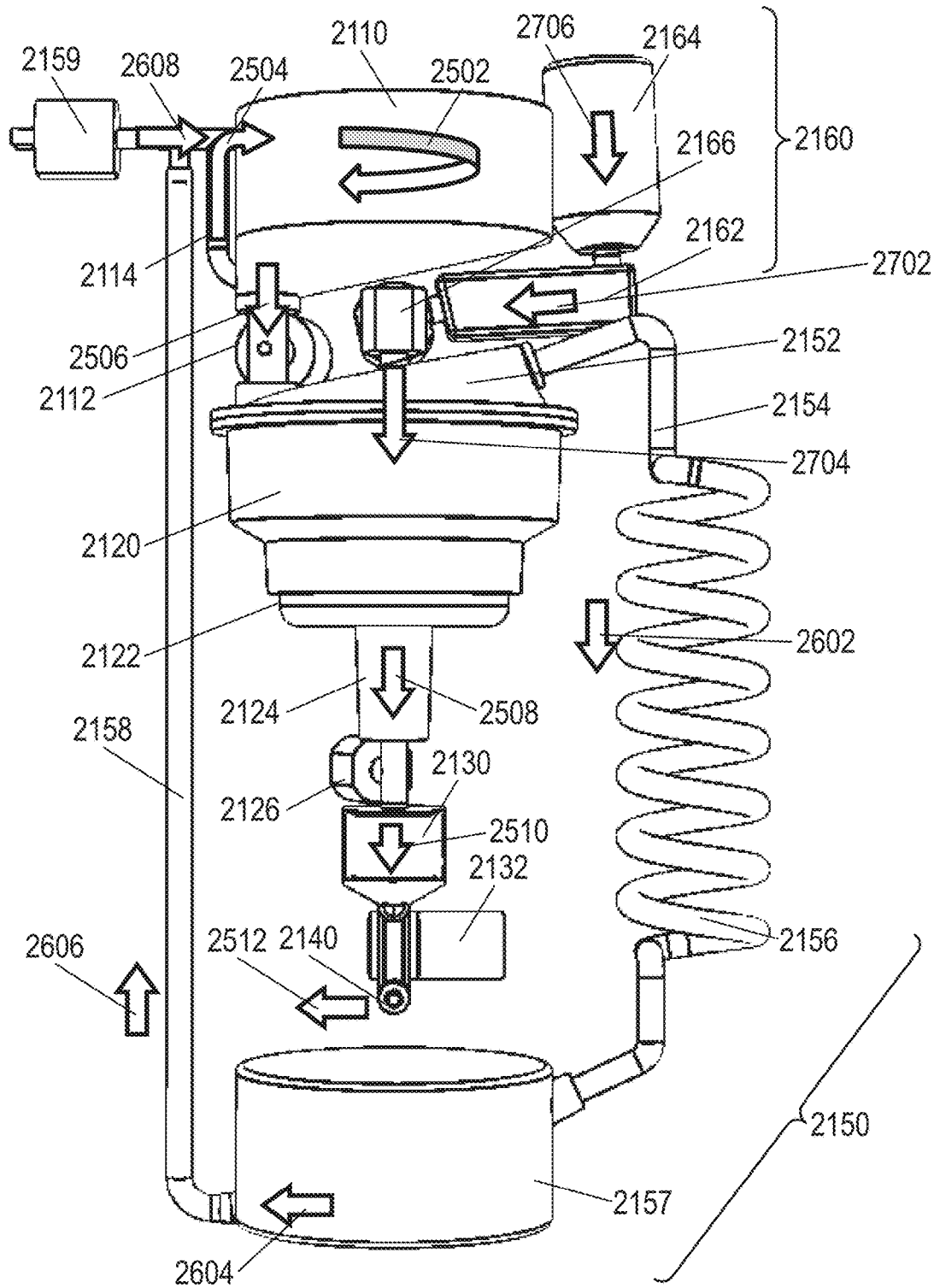
FIG. 12 schematically illustrates, according to an exemplary embodiment, a front view of an apparatus for extracting fatty compounds from a biological material, further showing direction of flow of fluids in the apparatus.

FIG. 12 schematically illustrates, according to an exemplary embodiment, a front view of an apparatus for extracting fatty compounds from a biological material, further showing direction of flow of fluids in the apparatus. The directions of fluid flow are illustrated with arrows.

According to some embodiments, the liquid in the extraction chamber 2110 flows circularly 502 during the extraction process. This circular flow 502 has a mixing effect on the content of the extraction chamber 2110, which increases the efficiency of extraction. According to some embodiments, the liquid in the extraction chamber 2110 further flows upwards 504 from a bottom side of the extraction chamber 2110 to an upper side of the extraction chamber 2110 through the extraction conduit 2114. The upwards 504 flow also has a mixing effect on the content of the extraction chamber 2110.

According to some embodiments, after the extraction process is completed, a liquid may include alcohol and fatty compounds extracted from the biological material flows in direction 2506 from the extraction chamber 2110 to the evaporator 2120.

According to some embodiments, during the evaporation process, a fatty compound flows in direction 2508 towards a bottom part of the evaporator, as the alcohol is evaporating, and accumulates in the lower compartment 2124 of the evaporator.

According to some embodiments, after the evaporation process is completed, the fatty compound flows in direction 2510 out of the evaporator 2120, or the lower compartment 2124 of the evaporator 2120, and towards the fatty compound outlet 2140, or into the fatty compound container 2130.

According to some embodiments, during collection of the fatty compound from the apparatus 2001, the fatty compound flows in direction 2512 through the fatty compound outlet 2140 outside the apparatus 2001.

According to some embodiments, when the apparatus 2001 includes an alcohol recycling module 2150, alcohol vapor flows in direction 2602 from the evaporator 2120, through the alcohol vapor outlet 2154, then through the condenser 2156 and into the recycled alcohol container 2157. According to some embodiments, recycled alcohol flows in direction 604 from the recycled alcohol container 2157 into the alcohol conduit. According to some embodiments, the recycled alcohol flows in direction 2606 through the alcohol conduit 2158 from the recycled alcohol container 2157 toward the extraction chamber 2110. According to some embodiments, the recycled alcohol flows in direction 2608 from the alcohol conduit 2158 into the extraction chamber 2110.

According to some embodiments, when the apparatus 2001 includes an oil supplement module 2160, oil flows in direction 2702 from the oil container 2162 toward the evaporator 2120. According to some embodiments, when the oil supplement module 2160 includes an oil injector 2166, oil exiting from the oil container 2162 flows in direction 2704 through the oil injector 2166 toward the evaporator 2120. According to some embodiments, when the oil supplement module 2160 includes a disposable oil container 2164, oil flows in direction 2706 from the disposable oil container 2164 toward the oil container 2162.

Figure 13:
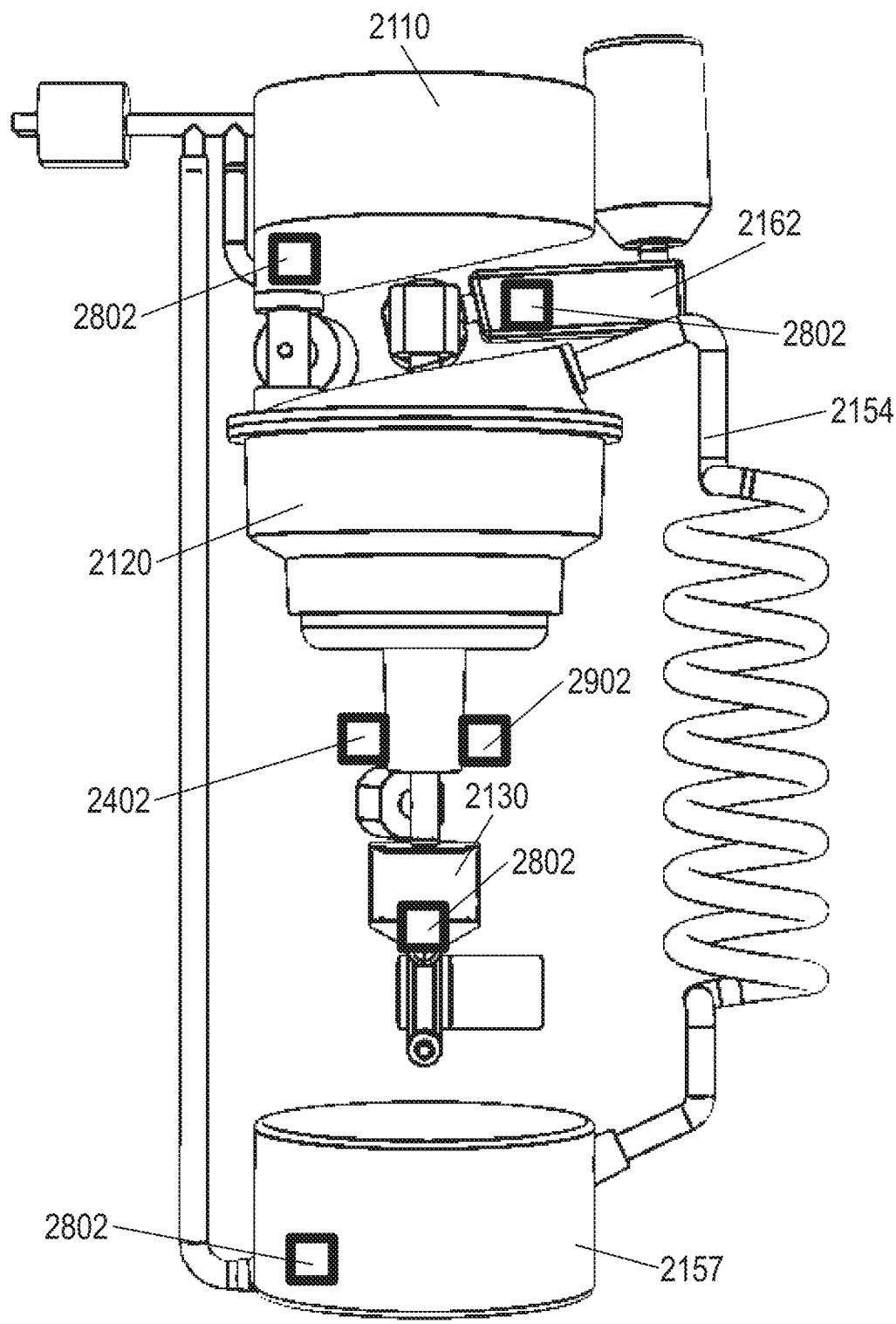
FIG. 13 schematically illustrates, according to an exemplary embodiment, a front view of an apparatus for extracting fatty compounds from a biological material, further showing positions of sensors and controllers in the apparatus.

FIG. 13 schematically illustrates, according to an exemplary embodiment, a front view of an apparatus for extracting fatty compounds from a biological material, further showing positions of sensors and controllers in the apparatus.

According to some embodiments, the apparatus 2001 includes at least one volume sensor 2802. Any type of volume sensor 2802 known in the art is under the scope of the present subject matter. According to some embodiments, the volume sensor 2802 is configured to determine a volume of a liquid in a container. Any type of mechanism for determining the volume of the liquid in the container is under the scope of the present subject matter. According to some embodiments, the volume of the liquid may be determined by positioning the volume sensor 2802 in the container. According to some embodiments, the volume of the liquid may be determined remotely. Thus, according to this embodiment, the volume sensor 2802 is not necessarily positioned in the container but may also be positioned in a distance away from the container. According to some embodiments, the volume sensor 2802 is electronically connected to a central processing unit, also known as controller.

Thus, according to some embodiments, the apparatus 2001 may further include a controller (e.g., such as controller 170, 270 described hereinabove). According to some embodiments, the controller is configured to receive data signals from sensors of the apparatus. According to some embodiments, the controller is configured to process the data received from the sensors. Any type of data processing known in the art is under the scope of the present subject matter. For example, the controller is configured to compare a level derived from a sensor to a predetermined level, as described hereinafter.

According to some embodiments, the apparatus 2001 may further include a memory. For example, the memory is configured to store predetermined levels, as described hereinafter.

Returning now to FIG. 13, following are some exemplary positions in the apparatus 2001 in which a volume sensor 2802 may determine a volume of a liquid, according to the embodiments described above. It should be noted that a volume sensor 2802 may determine a volume of a liquid in any one of the following exemplary positions independently of any other volume sensor 2802. In other words, any combination of positions in which a liquid volume may be determined by a volume sensor 2802 is under the scope of the present subject matter.

According to some embodiments, a volume sensor 2802 is configured to determine a volume of oil in the oil container 2162. According to some embodiments, a volume sensor 2802 is configured to determine a volume of alcohol and biological material in the extraction chamber 2110. According to some embodiments, a volume sensor 2802 is configured to determine a volume of the fatty compound in the fatty compound container 2130. According to some embodiments, a volume sensor 2802 is configured to determine a volume of the alcohol in the recycled alcohol container 2157.

According to some embodiments, after the controller receives data regarding a volume of a liquid in a container, the controller is further configured to send signals to a display. According to some embodiments, the apparatus 2001 may further include a display electronically connected to the controller. According to some embodiments, the display is configured inter alia to display at least one volume of a liquid in a container. According to some embodiments, the controller is further configured to send a signal to an alarm element, for example when according to the volume value received from a volume sensor—a container is empty. According to some embodiment, the apparatus 2001 may further include an alarm element electronically connected to the controller. Any type of alarm element known in the art may be used. According to some embodiments, the alarm element is configured to alarm a user when the alarm element receives an appropriate signal from the controller, for example alarming the user when a container is empty. According to some embodiments, the controller is configured to shut off the operation of the apparatus 2001 when there is a need to shut off the operation of the apparatus, for example when a container is empty.

According to some embodiments, the apparatus 2001 includes at least one temperature sensor 2402. According to some embodiments, the temperature sensor 2402 is configured to determine a temperature of a liquid in a part of the apparatus 2001. Any type of mechanism for determining the temperature of the liquid in a part of the apparatus 2001 may be used. According to some embodiments, the temperature of the liquid may be determined by positioning the temperature sensor 2402 in the part of the apparatus 2001. According to some embodiments, the temperature of the liquid may be determined remotely. For example, the temperature sensor 2402 is not necessarily positioned in the part of the apparatus 2001 but may also be positioned in a distance away from the part of the apparatus 2001. According to some embodiments, the temperature sensor 2402 is electronically connected to the controller.

According to some embodiments, a temperature sensor 2402 is configured to measure the temperature of a liquid in the evaporator 2120. According to some embodiments, the temperature sensor 2402 is configured to send a signal to the controller of the temperature level measured by the temperature signal 2402. According to some embodiments, the controller is configured to send a signal to the display to display the measured temperature. According to some embodiments, the controller is configured to compare the temperature of the liquid in the evaporator 2120 with a predetermined temperature stored in the memory. According to some embodiments, the controller is configured to shut off, for example, the heating element 2122 when the temperature of the liquid in the evaporator 2120 is above the predetermined temperature. According to some embodiments, the controller is configured to switch on, for example, the heating element 2122 when the temperature of the liquid in the evaporator is below the predetermined temperature. According to some embodiments, the controller is configured to send a signal to the alarm element, for example when a measured temperature is different from the predetermined temperature.

According to some embodiments, the apparatus 2001 may further include at least one evaporation sensor 2902 configured to determine whether evaporation of alcohol in the evaporator 2120 is complete. Any type of mechanism known in the art for determining whether evaporation of alcohol in the evaporator 2120 is complete is under the scope of the present subject matter. For example, the evaporation sensor 2902 may be a differential pressure sensor configured to measures the change in pressure across two ports in the evaporator. When the evaporation of the alcohol is complete the differential pressure in the evaporator 2120 is different from the differential pressure when the alcohol is still evaporating.

According to some embodiments, the evaporation sensor 2902 is electronically connected to the controller. According to some embodiments, the evaporation sensor 2902 is configured to send a data signal to the controller regarding the evaporation state of the alcohol in the evaporator 2120. According to some embodiments, the controller is configured to send to the display a signal to display the state of evaporation of the alcohol in the evaporator 2120. According to some embodiments, the controller is configured to determine whether the evaporation of the alcohol is completed according to the data received from the evaporation sensor 2902. For example, when the evaporation sensor 2902 is a differential pressure sensor, the controller is configured to compare the differential pressure measured in the evaporator 2120 with a predetermined differential pressure value and accordingly determine whether evaporation is ongoing or completed. According to some embodiments, the controller is configured to transmit a signal to the heating element 2122 to shut-off when the evaporation of the alcohol is completed.

According to some embodiments, the controller is electronically connected to each one of the pumps and valves of the apparatus 2001 and control their operation according to data received from the sensors of the apparatus 2001. For example, the controller is configured to open the evaporator valve 2126 when evaporation of the alcohol in the evaporator 2120 is completed. Another example is that the controller is configured to open the extraction chamber valve 2112 when a predetermined time has passed since the start of the extraction process in the extraction chamber 2110.

Figure 14:
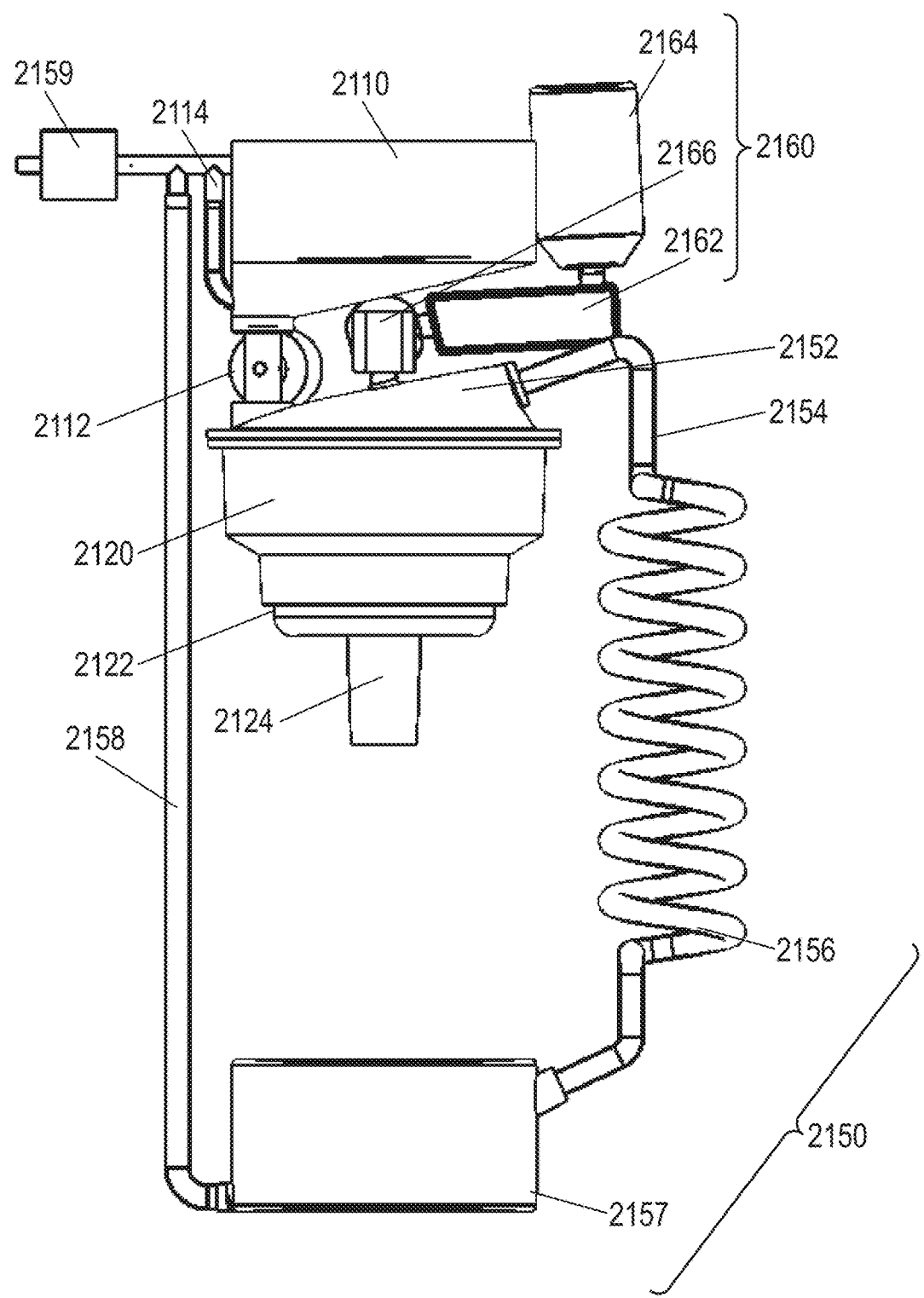
FIG. 14 schematically illustrates, according to an exemplary embodiment, a front view of an extracting apparatus.

Reference is now made to FIG. 14 which schematically illustrates, according to an exemplary embodiment, an extracting apparatus 2002.

According to some embodiments, the extracting apparatus 2002 is configured to extract fatty compounds from a biological material. Following is a list of components of the extracting apparatus 2002. The functions of the components of the extracting apparatus 2002, their interactions and their optionality were already described above in relation to the apparatus 2001. According to some embodiments, the extracting apparatus 2002 includes an extraction chamber 2110 and an evaporator 2120. According to some embodiments, the extracting apparatus 2002 may further include an alcohol recycling module 2150, including all its embodiments described above. According to some embodiments, the extracting apparatus 2002 may further include an oil supplement module 2160, including all its embodiments described above.

Figure 15A:
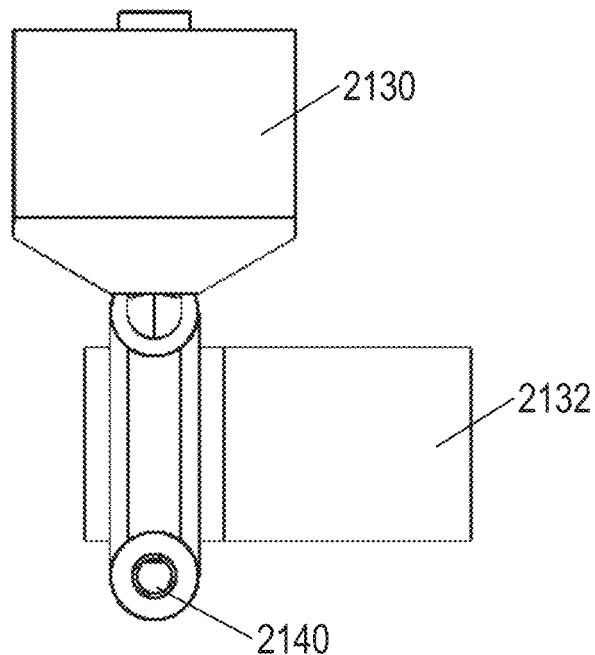
FIGS. 15A and 15B schematically illustrate, according to an exemplary embodiment, a front view and a side view, respectively, of a storing and distributing apparatus.
Figure 15B:
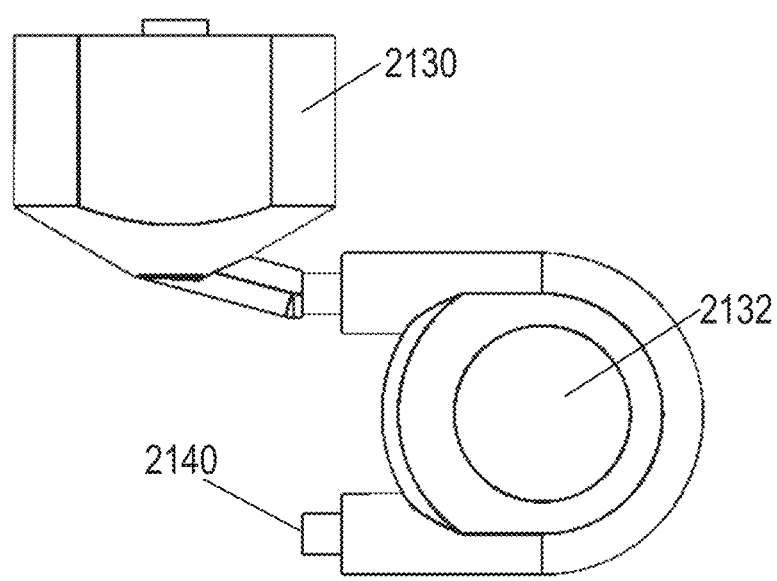

Reference is now made to FIGS. 15A and 15B which schematically illustrate, according to an exemplary embodiment, a storing and distributing apparatus 2003.

The distributing may, for example, relate to exiting an extracted fatty compound from an apparatus, exiting dosages of extracted fatty compound from an apparatus, inserting the extracted fatty compound into a reservoir, for example a capsule, a encapsulation of the extracted fatty compounds, for example, by a capsule, and any combination thereof.

According to some embodiments, the storing and distributing apparatus 2003 is configured to store and distribute fatty compounds. Following is a list of components of the storing and distributing apparatus 2003. The functions of the components of the storing and distributing apparatus 2003, their interactions and their optionality were already described above in relation to the apparatus 2001. According to some embodiments, the storing and distributing apparatus 2003 includes a fatty compound container 2130 and a fatty compound outlet 2140. According to some embodiments, the storing and distributing apparatus 2003 may further include a fatty compound pump 2132.

Reference is now made to FIGS. 16A, 16B, 16C and 16D which schematically illustrate, according to an exemplary embodiment, an evaporator 2120.

Some embodiments may provide a provides an evaporator 2120 configured to heat a mixture of multiple liquids and evaporating at least one of the liquids, while collecting at least one other liquid. According to some embodiments, described above, the evaporator 2120 includes an upper compartment 2121, a lower compartment 2124 below the upper compartment 2121, and a heating element 2122 attached to the upper compartment 2121, or to the lower compartment 2124, or to the upper compartment 2121 and the lower compartment 2124. The heating element 2122 is configured to heat a mixture of multiple liquids inside the evaporator 2120.

Figure 16A:
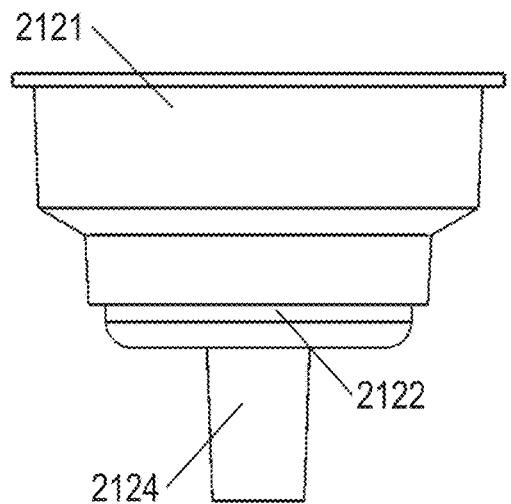
FIGS. 16A, 16B, 16C and 16D schematically illustrate, according to an exemplary embodiment, a front view, a front cross-section view, a front perspective view and an upper view, respectively, of an evaporator.
Figure 16B:
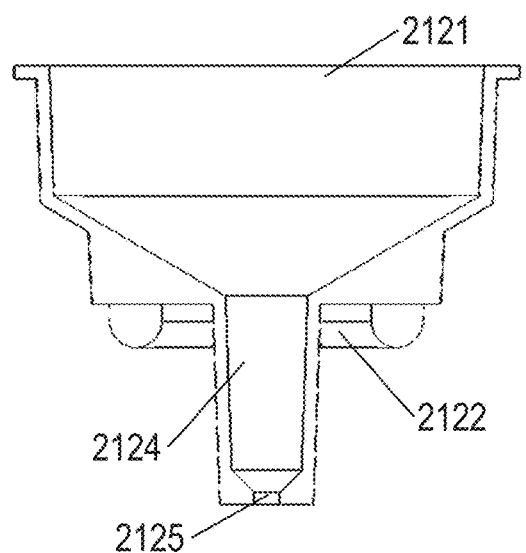
Figure 16C:
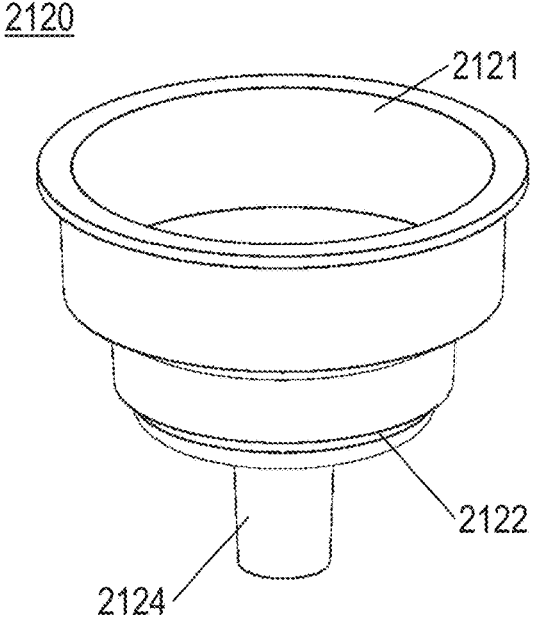

According to some embodiments, the inner structure of the upper compartment 2121 is configured to direct any liquid present in the upper compartment 2121 toward the lower compartment 2124. This inner structure of the upper compartment 2121 increases the efficiency of collecting substantially all the liquid that is left in the evaporator 2120 after at least on other type of liquid is evaporated. If, for example the bottom of the upper compartment 2121 was flat, and the walls of the upper compartment 2121 were perpendicular, a great amount of the liquid that is not evaporated is left in the upper compartment 2121 and is not collected in the lower compartment 2124. Therefore, an exemplary inner structure of the upper compartment 2121 is a funnel-like structure, as illustrated in FIG. 16B. This ensures that any liquid remaining in the upper compartment 2121 is directed towards the lower compartment 2124. It should be noted that the funnel-like inner structure of the upper compartment 2121, illustrated in FIG. 16B, should not be considered as limiting the scope of the present subject matter. Any type of structure that direct substantially all of the liquid in the upper compartment 2121 towards the lower compartment 2124 is under the scope of the present subject matter.

Figure 16D:
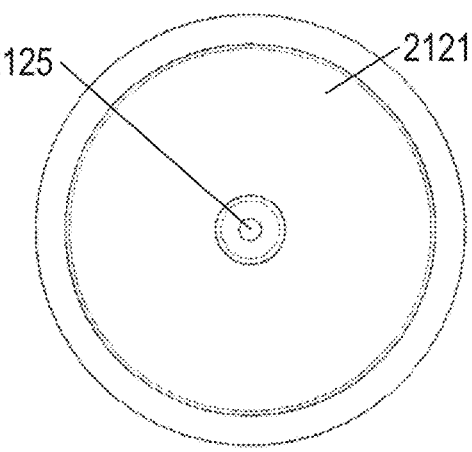

According to some embodiments, the evaporator 2120 includes an evaporator outlet 125 at the bottom of the lower compartment 2124, as illustrated in FIGS. 16B and 16D. Thus, the inner structure of the lower compartment 2124 is configured to direct all the liquid that is in the lower compartment 2124 toward the evaporator outlet 125. Therefore, embodiments of the structure of the lower compartment 2124 are similar to the embodiments of the structure of the upper compartment 2121 described above.

According to some embodiments, the evaporator 2120 is configured to receive a mixture of multiple liquids and heat the mixture of the multiple liquids. According to some embodiments, the evaporator 2120 is configured to evaporate at least one of the liquids of the mixture, while retaining at least one of the liquids of the mixture. According to some embodiments, the at least one liquid that is to be evaporated has a lower density than the at least one liquid that is to be retained, and the boiling point of the at least one liquid that is to be evaporated is lower than the boiling point of the at least one liquid that is to be retained. For the sake of simplicity only, an exemplary mixture of liquids is a mixture of an alcohol and an oil, for example ethanol and soybean oil. Ethanol has a density of substantially 0.79 gr/ml and a boiling point of substantially 78° C. Soybean oil has a density of substantially 0.9 gr/ml and a smoke point of substantially 257° C. Oils have a smoke point that is the temperature in which they start to disintegrate, or burn, and a theoretical boiling point of an oil is above the smoke point. For example, there is a need to retain the soybean oil and remove the ethanol from the mixture. As may be seen, the ethanol has a density and a boiling point that are lower than the density and the boiling point of the soybean oil. Therefore, this separation may be achieved by the evaporator 2120 of the present subject matter. A mixture of soybean oil and ethanol is placed inside the evaporator 2120, and is heated at a temperature of substantially 78° C. In this temperature the ethanol evaporates while the soybean oil is retained, as desired. Because of the inner structure of the evaporator 2120 of the present subject matter, as described above, during the evaporation of the ethanol, the substantially all the soybean oil accumulates in the lower compartment 2124, just above the evaporator outlet 125, when of-course the evaporator outlet 125 is plugged. Once the evaporator outlet is un-plugged, after substantially all the ethanol is evaporated, substantially all of the soybean oil exits the evaporator 2120 and collected. This efficient collection of substantially all the soybean oil may be achieved with the evaporator of the present subject matter.

Some embodiments may provide a method for extracting a fatty compound from a biological material. It should be emphasized, again, that the fatty compound may be a single fatty compound or a mixture of multiple fatty compounds. According to some embodiments, the method for extracting a fatty compound from a biological material is performed by using either the extracting apparatus 2002, or the extracting-storing-distributing apparatus 2001, as described hereinabove. The method for extracting fatty compounds from a biological material may include mixing a biological material with an alcohol, and obtaining a mixture of the biological material and the alcohol, for extracting the fatty compound from the biological material into the alcohol, and obtaining a mixture of the fatty compound and the alcohol; and evaporating substantially all the alcohol by heating the mixture of the fatty compound and the alcohol at substantially a boiling temperature of the alcohol, while retaining the fatty compound and obtaining an evaporated alcohol.

The biological material may be, for example, an entire plant, or at least one part of a plant. For example, the plant may be Maynabis. In another example, the plant may be medical Maynabis.

The fatty compound may be, for example, Maynabis fatty compound. For example, the fatty compound may include Maynabidiol (CBD). In another example, the fatty compound may include tetrahydromaynabinol (THC). In another example, the fatty compound may be a mixture of CBD and THC.

The alcohol may be, for example, ethanol. In another example, the alcohol may be a mixture of multiple types of alcohol. In another example, the alcohol may be a mixture of multiple types of alcohol of which one type of alcohol is ethanol.

According to some embodiments, the method for extracting a fatty compound from a biological material is performed by using either an extracting apparatus 2002, or an extracting-storing-distributing apparatus 2001.

According to some embodiments, the mixing of the biological material with the alcohol is performed in an extraction chamber 2110 of an extracting apparatus 2002, or an extracting-storing-distributing apparatus 2001.

According to some embodiments, the evaporating of alcohol is performed in an evaporator 2120 of an extracting apparatus 2002, or an extracting-storing-distributing apparatus 2001.

When the alcohol is ethanol, the heating of the mixture of the fatty compound and the alcohol is at a temperature range of substantially 70-120° C. According to some embodiments, the heating of the mixture of the fatty compound and the alcohol is at a temperature range of substantially 78-100° C. According to some embodiments, the heating of the mixture of the fatty compound and the alcohol is at substantially a boiling temperature of the alcohol in the mixture. This may be based on the phenomenon that the boiling temperature of an alcohol mixed with oil is higher than the boiling temperature of the alcohol itself. During this method, the mixture of the fatty compound and the alcohol should be heated at the boiling temperature of the alcohol in the mixture. This shift of the boiling temperature of the alcohol with the fatty compound is influenced by a variety of factors, for example the type of fatty compound, the type of alcohol, the relative amount of the alcohol and fatty compound in the mixture, and the like. Therefore, this shift is boiling temperature of the alcohol is unpredictable, but rather should be experimentally determined. This issue of experimentally determining the boiling temperature of the alcohol in a mixture with a fatty compound is under the scope of the present subject matter.

According to some embodiments, the method for extracting a fatty compound from a biological material may further include adding a carrier oil (e.g., diluting liquid as described hereinabove). Any type of carrier oil is under the scope of the present subject matter. According to some embodiments, the carrier oil is a neutral oil. That means that the carrier oil has no effects or activities as the fatty compound that is extracted from the biological material. According to some embodiments, the carrier oil is added to the mixture of the fatty compound and the alcohol before the heating of the mixture. According to some embodiments, the carrier oil is added to the mixture of the fatty compound and the alcohol during the heating and the evaporation of the alcohol. According to some embodiments, the carrier oil is added to the fatty compound after substantially all the alcohol is evaporated.

According to some embodiments, the method for extracting a fatty compound from a biological material may further include homogenizing the mixture of fatty compound and carrier oil. According to some embodiments, the homogenizing the mixture of fatty compound and carrier oil is by heating the mixture at a homogenization temperature that causes homogenization of the mixture of fatty compound and carrier oil. The homogenization temperature and the heating period are influenced by a variety of factors, and therefore unpredictable, but rather should be experimentally determined. This issue of experimentally determining the homogenization temperature and the heating period for homogenizing the fatty compound and the carrier oil is under the scope of the present subject matter. For example, the aforementioned embodiment of heating at a temperature range of substantially 70-120° C. may be extended beyond complete evaporation of the alcohol in order to homogenize the mixture of the fatty compound with the carrier oil.

According to some embodiments, the method for extracting a fatty compound from a biological material may further include recycling of the evaporated alcohol. According to some embodiments, the recycling of the evaporated alcohol includes condensing the evaporated alcohol to a recycled liquid alcohol. According to some embodiments, the recycling of the evaporated alcohol may further include returning the recycled liquid alcohol to the mixture of the biological material and the alcohol.

According to some embodiments, the recycling of the evaporated alcohol is performed by an alcohol recycling module 2150 of an extracting apparatus 2002, or an extracting-storing-distributing apparatus 2001. According to this embodiment, the recycling of the evaporated alcohol includes: preventing escape of the evaporated alcohol from the evaporator 2120 by covering the evaporating with an evaporator cover 2152; collecting the evaporated alcohol through an alcohol vapor outlet 2154 of the evaporator 2120 or the evaporator cover; and passing the evaporated alcohol through a condenser 2156 and obtaining a recycled liquid alcohol.

According to some embodiments, the recycling of the evaporated alcohol may further include, after passing the evaporated alcohol through a condenser 2156 and obtaining a recycled liquid alcohol—collecting the recycled liquid alcohol in a recycled alcohol container 2157.

According to some embodiments, the recycling of the evaporated alcohol may further include, after passing the evaporated alcohol through a condenser 2156 and obtaining a recycled liquid alcohol, or after collecting the recycled liquid alcohol in a recycled alcohol container 2157—directing the recycled liquid alcohol back to the extraction chamber 2110.

The present subject matter further provides a method for storing and distributing a liquid fatty compound. Any type of fatty compound is under the scope of the present subject matter, according to embodiments described herein. As mentioned above, this method is for storing and distributing a liquid fatty compound. The fatty compound may be retained in a liquid phase by keeping the fatty compound in a range of temperatures and pressure level in which the fatty compound is in a liquid state. Preferably, the fatty compound is liquid in ambient temperature and pressure level.

According to some embodiments, the method for storing and distributing a liquid fatty compound is performed by using either the storing and distributing apparatus 2003, or the extracting-storing-distributing apparatus 2001, of the present subject matter. The method for storing and distributing apparatus 2003 includes: collecting a liquid fatty compound in a fatty compound container 2130, and allowing flow of the liquid fatty compound out of the fatty compound container 2130 through a fatty compound outlet.

According to some embodiments, the allowing flow of the liquid fatty compound is by using a fatty compound pump 2132.

According to some embodiments, the flow of the liquid fatty compound is continuous. According to some embodiments, the flow of the liquid fatty compound is in doses. According to some embodiments, the doses of the liquid fatty compound are pre-determined.

According to some embodiments, the flow of the liquid fatty compound is into a capsule.

Some embodiments may provide a method for extracting, storing and distributing a fatty compound from a biological material. This method may be a combination of the previously described method for extracting a fatty compound from a biological material and the method for storing and distributing a liquid fatty compound.

According to some embodiments, the method for extracting, storing and distributing a fatty compound from a biological material is performed by the extracting-storing-distributing apparatus 2001, of the present subject matter. Here are the basic steps of the method for extracting, storing and distributing a fatty compound from a biological material. Other embodiments of this method are described above and are not be repeated.

The method for extracting, storing and distributing a fatty compound from a biological material includes: mixing a biological material with an alcohol, and obtaining a mixture of the biological material and the alcohol, for extracting the fatty compound from the biological material into the alcohol, and obtaining a mixture of the fatty compound and the alcohol; evaporating substantially all the alcohol by heating the mixture of the fatty compound and the alcohol at substantially a boiling temperature of the alcohol, while obtaining a fatty compound and an evaporated alcohol; and collecting the liquid fatty compound.

Figure 17A:
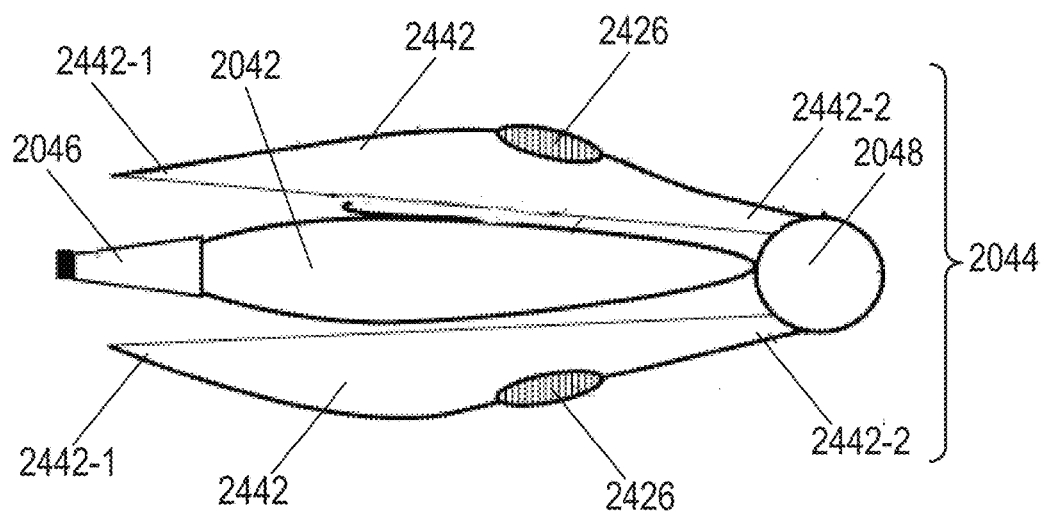
FIG. 17A schematically illustrates, according to an exemplary embodiment, a side cross-section view of a capsule in a resting state.

FIG. 17A schematically illustrates, according to an exemplary embodiment, a side cross-section view of a capsule in a resting state.

Figure 17B:
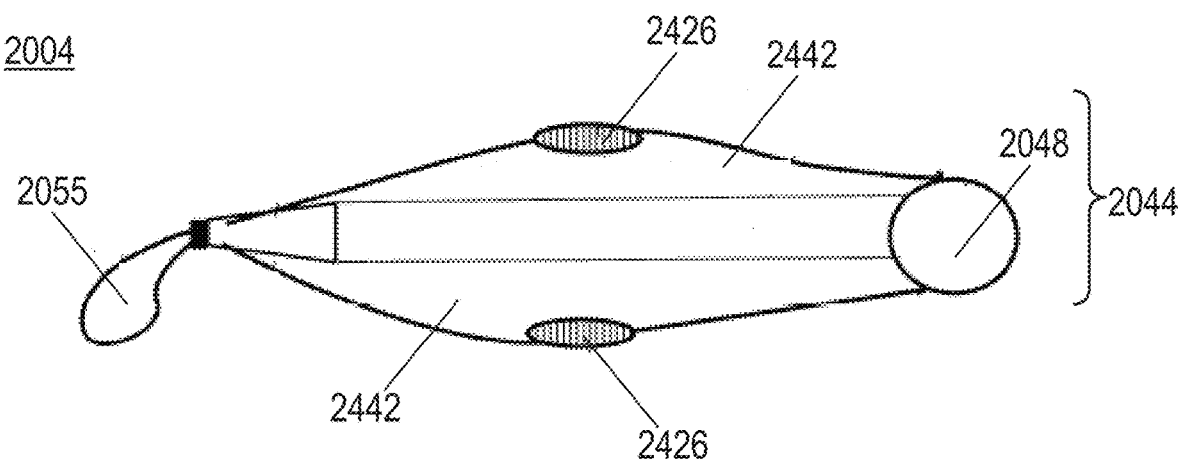
FIG. 17B schematically illustrates, according to an exemplary embodiment, a side cross-section view of a capsule in an expelling state.

FIG. 17B schematically illustrates, according to an exemplary embodiment, a side cross-section view of a capsule in an expelling state.

According to some embodiments, the capsule 2004 includes a collapsible reservoir 2042 configured to store a liquid and a pressing element 2044 enclosing the collapsible reservoir 2042 and configured to press the collapsible reservoir 2042.

According to some embodiments, the collapsible reservoir 2042 is made of an elastic material that is configured to be compressed when pressed by the pressing element 2044. The compressing of the collapsible reservoir 2042 exerts pressure on a liquid inside the collapsible reservoir 2042 that pushes the liquid out of the collapsible reservoir 2042 through a capsule outlet 2046, as described hereinafter.

According to some embodiments, the capsule 2004 may further include a capsule outlet 2046 fluidically connected to the collapsible reservoir 2042 and configured to allow exit of a liquid from the collapsible reservoir 2042, when the collapsible reservoir is compressed. According to some embodiments, the capsule outlet 2046 is part of the collapsible reservoir 2042, for example in the form of a hole in the collapsible reservoir 2042 that is plugged with a cover (not shown), or a part of the collapsible reservoir 2042 that is configured to be punctured in order to allow exit of a liquid from the collapsible reservoir 2042. According to some embodiments, the capsule outlet 2046 is a compartment that is fluidically connected to the collapsible reservoir 2042, as illustrated in FIGS. 17A and 17B.

According to some embodiments, the capsule 2004 may further include a capsule inlet 2048 fluidically connected to the collapsible reservoir 2042 and configured to allow insertion of a liquid into the collapsible reservoir 2042. According to some embodiments, the capsule inlet 2048 is part of the collapsible reservoir 2042, for example in the form of a hole in the collapsible reservoir 2042 that is plugged with a cover, or a part of the collapsible reservoir 2042 that is configured to be punctured in order to allow insertion of a liquid from the collapsible reservoir 2042 and then resealed. It should be noted that the aforementioned embodiments of the capsule inlet 2048 should not be considered as limiting the scope of the present invention. Any type of capsule inlet 2048 that is configured to allow insertion of a liquid into the collapsible reservoir 2042 while retaining the intactness of the collapsible reservoir 2042 so liquid will not leak through the capsule inlet 2048, is under the scope of the present subject matter.

As mentioned above, the pressing element 2044 encloses the collapsible reservoir 2042 and is configured to press the collapsible reservoir 2042. Any type of pressing element 2044 that encloses the collapsible reservoir 2042 and is configured to press the collapsible reservoir 2042, is under the scope of the present invention. An exemplary pressing element 2044 is illustrated for example in FIGS. 17A and 17B. According to the embodiment illustrated, for example, in FIGS. 17A and 17B, the pressing element 2044 includes two arms 2442 connected one to the other, each arm may include a free end 2442-1 and a connected end 2442-2 that connects to a connected end 2442-2 of the other arm 2442. The orientation of the pressing element 2044 in relation to the collapsible reservoir 2042 is such that the free ends 2442-1 of the arms 2442 are at the same side of the capsule outlet 2046 and the connected ends 2442-2 of the arms 2442 are distant from the capsule outlet 2046. As may be seen in FIGS. 17A and 17B, the connected ends 2442-2 of the arms 2442 are adjacent to the capsule inlet 2048, but this is only an exemplary embodiment, and should not be considered as limiting the scope of the present subject matter. The connected ends 2442-2 may be positioned anywhere in relation to the collapsible reservoir 2042, as long as there are distant from the capsule outlet 2046.

FIG. 17A illustrates a capsule 2004 in a resting state. In the resting state, the collapsible reservoir 2042 is full with a liquid 2055 and the pressing element 2044 does not press the collapsible reservoir 2042. For example, the arms 2442 are opened and do not press the collapsible reservoir 2042. As a result, no pressure is exerted on the collapsible reservoir 2042, and the liquid 2055 remains in the collapsible reservoir 2042. FIG. 7B illustrates a capsule 2004 in an expelling state. In the expelling state, the pressing element 2044 presses the collapsible reservoir 2042. For example, the arms 2442 of the pressing element 2044 are now closed, namely pushed one toward the other, and apply pressure on the collapsible reservoir 2042. As a result, the collapsible reservoir 2042 is squeezed and the liquid 2055 is expelled from the collapsible reservoir 2042 though the capsule outlet 2046.

According to some embodiments, at least one of the arms 2442, preferably both arm 2442, includes a finger support 2426 configured to support a finger of a user pressing the arm 2442 and prevent slippage of the finger during pressing. This embodiment prevents slippage of the pressing element 2044, and the entire capsule 2004, when it is held and pressed by a user. This embodiment further increases the efficiency of pressing of the pressing element 2044 by the user's fingers, since the fingers firmly press the arms 2442.

According to some embodiments, the connecting ends 2442-2 of the arms 2442 of the pressing element 2044 are pivotally connected. This embodiment improves the movement of the arms 2442 on in relation to the other, since they are able to swivel about an axis.

According to some embodiments, the arms 2442 are elastic, and the resting state of the arm 2442 is the default state of the arms 2442. In other words, when no pressure is applied on the arms 2442, they are open and the capsule 2004 is in a resting state, as illustrated for example in FIG. 17A. As long as pressure is applied on the arms 2442, the arms 2442 are configured to be pressed and the capsule 2004 is in an expelling state. Once the pressure on the arms 2442 is relieved, the arms 2442 open and return to the default state. Any type of mechanism known in the art for rendering the arms 2442 elastic is under the scope of the present subject matter. For example, the arm 2442 may be made of an elastic material. Another example is that an elastic member, for example a spring, is attached to the arms 2442.

Figure 18A:
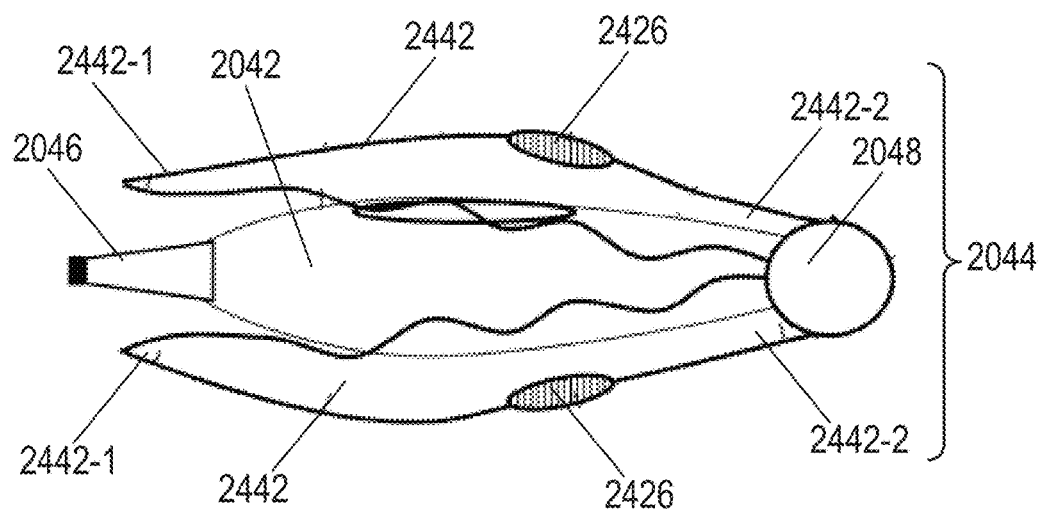
FIG. 18A schematically illustrates, according to an exemplary embodiment, a side cross-section view of a full-expel capsule in a resting state.

FIG. 18A schematically illustrates, according to an exemplary embodiment, a side cross-section view of a full-expel capsule (e.g., such as capsule 700 described above with respect to FIG. 7) in a resting state.

Figure 18B:
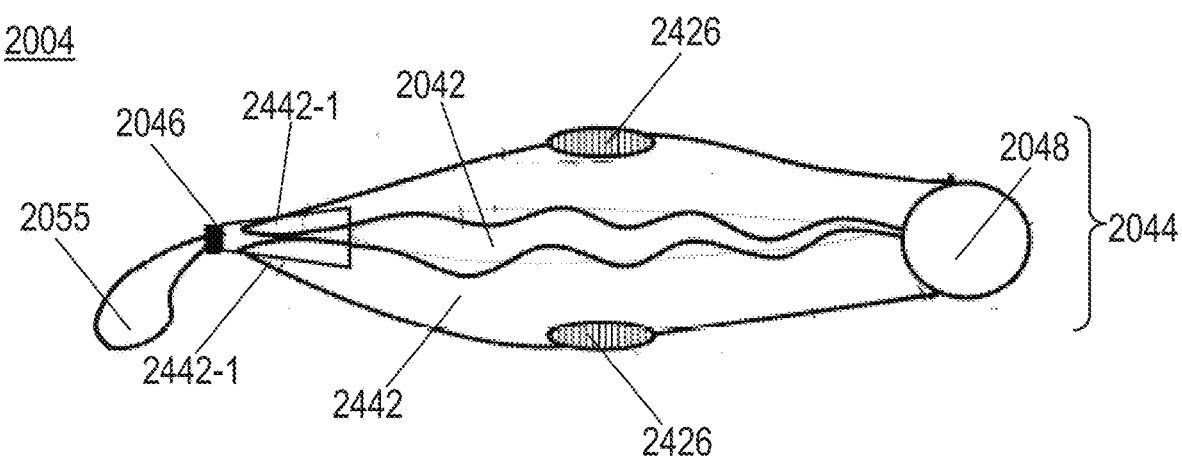
FIG. 18B schematically illustrates, according to an exemplary embodiment, a side cross-section view of a full-expel capsule in an expelling state.

FIG. 18B schematically illustrates, according to an exemplary embodiment, a side cross-section view of a full-expel capsule in an expelling state.

The capsule 2004 illustrated in FIGS. 17A and 17B is configured to expel any amount of liquid 2055 from the collapsible reservoir 2042. On the other hand, the capsule 2004 illustrated in FIGS. 18A and 18B is configured to fully expel the liquid 2055 from the collapsible reservoir 2042. In other word, pressing the collapsible reservoir 2042 with the pressing element 2044 cause expel of the entire content of the collapsible reservoir 2042, expel of the entire amount of liquid 2055 from the collapsible reservoir 2042. For this purpose, surfaces of the arms 2442 that are configured to be in contact with the collapsible reservoir 2042 during pressing have a wave-like structure, as illustrated in FIGS. 18A and 18B. This wave-like structure of the surfaces of the arms 2442 ensures complete squeezing of the collapsible reservoir 2042 and complete expel of the liquid 2055 from the collapsible reservoir 2042.

Figure 19A:
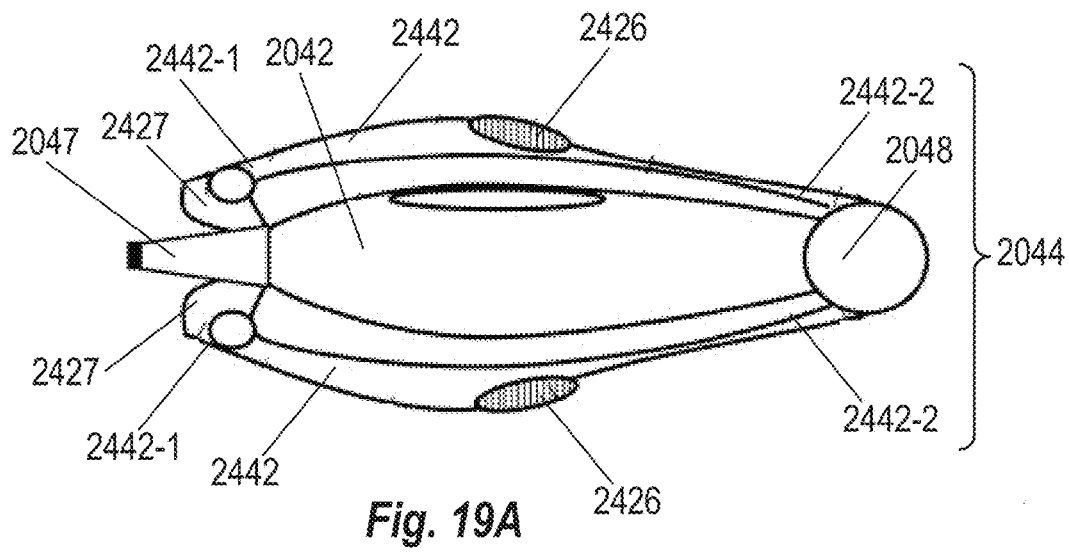
FIG. 19A schematically illustrates, according to an exemplary embodiment, a side cross-section view of a doze-expel capsule in a resting state.

FIG. 19A schematically illustrates, according to an exemplary embodiment, a side cross-section view of a doze-expel capsule (e.g., such as capsule 800 described above with respect to FIG. 9) in a resting state.

Figure 19B:
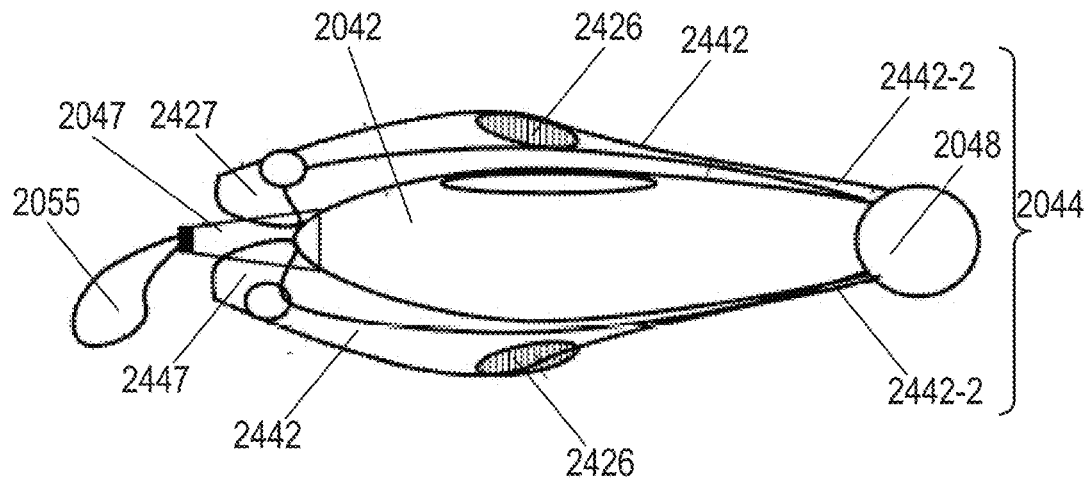
FIG. 19B schematically illustrates, according to an exemplary embodiment, a side cross-section view of a dose-expel capsule in an expelling state.

FIG. 19B schematically illustrates, according to an exemplary embodiment, a side cross-section view of a dose-expel capsule in an expelling state.

According to some embodiments, the capsule 2004 is configured to expel doses of a liquid 2055 from the collapsible reservoir 2042. According to this embodiment, the capsule outlet is a compartment configured to determine the dose of liquid 2055 that is to be expelled. This type of outlet is termed hereinafter "compartment outlet 2047". The compartment outlet 2047 is fluidically connected to the collapsible reservoir 2042. According to some embodiments, at least one of the arms 2442 includes a compartment pressing element 2427, at a side of the arm 2442 that is adjacent to the compartment outlet 2047. In a resting state, illustrated in FIG. 19A, the arms 2442 do not press the collapsible reservoir 2042 and the compartment outlet 2047 is empty. In the expelling state, illustrated in FIG. 19B, once the arms 2442 press the collapsible reservoir 2042, the collapsible reservoir 2042 is slightly squeezed and as a result some liquid 2055 is pushed toward and fill the compartment outlet 2047. When the arms 2442 further press the collapsible reservoir 2042, the compartment pressing elements 2427 press the compartment outlet 2047 and in one hand block passage of liquid from the collapsible reservoir 2042 into the compartment outlet 2047, while on the other hand the compartment outlet 2047 is squeezed and a dose of liquid 2055 is expelled.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A device for automatic extraction, storage and encapsulation of fatty compounds, the device comprising:
   a solvent supply unit configured to at least one of supply and store a liquid solvent;
   an extraction unit configured to provide a liquid mixture comprising fatty compounds extracted from biological material and a liquid solvent;
   a diluting liquid supply unit configured to at least one of supply and store a diluting liquid;
   an evaporation and reaction unit;
   a storage unit comprising one or more storage outlet ports;
   fluid conduits connecting the solvent supply unit with the extraction unit, the evaporation and reaction unit with the extraction unit, the storage unit with the evaporation and reaction unit, and the diluting liquid supply unit with the evaporation and reaction unit; and
   a controller configured to:
      receive user's preferences concerning the liquid mixture to be produced;
      determine operation parameters based on the user's preferences;
      control delivery of the liquid solvent from the solvent supply unit to the extraction unit based on the determined operation parameters;
      control extraction of the fatty compounds in the extraction unit based on the determined operation parameters;
      control delivery of the liquid mixture from the extraction unit to the evaporation and reaction unit based on the determined operation parameters;
      control evaporation of the solvent from the liquid mixture in the evaporation and reaction unit based on the determined operation parameters;
      control delivery of a diluting liquid from the diluting liquid supply unit to the evaporation and reaction unit based on the determined operation parameters;
      control delivery of the liquid mixture from the evaporation and reaction unit to the storage unit based on the determined operation parameters;
      detect safe connection of each of at least one of one or more capsules to one of the one or more storage outlet ports of the storage unit; and
      control filling of at least one of the one or more connected capsules with the liquid mixture from the storage unit based on the determined operation parameters.

2. The device of claim 1, wherein the extraction unit comprises:
   a filter configured to separate the biological material from the liquid mixture; and
   an extraction chamber configured to accommodate the liquid mixture;
   wherein the controller is configured to control circulation of the liquid mixture by controlling delivery of the liquid mixture from a downstream portion of the extraction chamber to at least one of: the filter and an upstream portion of the extraction chamber.

3. The device of claim 2, wherein the filter comprises:
   a filtering compartment adapted to receive and accommodate the biological material; and
   one or more conduits comprising multiple sprinkling holes, the one or more conduits are connectable to a solvent supply unit and adapted to deliver the liquid solvent and to sprinkle the liquid solvent into the filtering compartment through the multiple sprinkling holes.

4. The device of claim 3, wherein:
   the filtering compartment comprises an aperture through which the biological material may be introduced into the filtering compartment;
   the device comprises a covering adapted to removably cover the aperture; and
   at least one of the one or more conduits is attached to the covering.

5. The device of claim 2, wherein:
   at least the filtering compartment of the filter is deformable;
   the device comprises a filter deforming mechanism; and
   wherein the controller is configured to control the filter deforming mechanism to deform at least the filtering compartment of the filter to squeeze the biological material and to remove residuals of the liquid mixture from the biological material.

6. The device of claim 1, wherein the evaporation and reaction unit comprises:
   an evaporation and reaction chamber; and
   a heating element;
   wherein the controller is configured to at least one of:
      control the heating element to heat the liquid mixture in the evaporation and reaction chamber above a boiling temperature of the liquid solvent to evaporate the solvent from the liquid mixture; and
      control the heating element to heat the liquid mixture above a specified temperature value to induce at least one component of the liquid mixture undergo a specified chemical reaction.

7. The device of claim 6, wherein the evaporation and reaction chamber tapers in a direction extending from an upstream portion to a downstream portion of the evaporation and reaction chamber.

8. The device of claim 6, wherein:
the evaporation and reaction chamber comprises a liquid mixture compartment at the downstream portion thereof, the liquid mixture compartment is adapted to accommodate the liquid mixture that has not been evaporated;
a volume of the liquid mixture compartment is predetermined based on a maximal volume of the liquid mixture that may be produced by the device during one operational cycle.

9. The device of claim 8, wherein the heating element is disposed adjacent to the liquid mixture compartment.

10. The device of claim 1, wherein the controller is configured to control a cleaning of the device, the controller is configured to:
control delivery of the liquid solvent to the extraction unit;
control delivery of the liquid solvent from the extraction unit to the evaporation unit; and
control evaporation of the liquid solvent in the evaporation and reaction unit.

11. The device of claim 10, wherein the controller is configured to:
control delivery of the liquid solvent from the evaporation and reaction unit to the storage unit;
detect safe connection of a dedicated cleaning capsule to the storage unit; and
control filling of the dedicated cleaning capsule with the liquid solvent from the storage unit.

12. The device of claim 1, comprising a housing, the housing comprises:
a barrier structure that divides an interior of the housing into a first sub-zone and a second sub-zone;
wherein the first sub-zone comprises is free of any electrical components; and
wherein the barrier structure is sealed to prevent transfer of flammable vapors from the first sub-zone to the second sub-zone.

13. A kit comprising the device of claim 1 and one or more capsules connectable to the one or more storage outlet ports and adapted to be filled with the liquid mixture from at least one of the one or more storage containers.

14. The kit of claim 13, wherein each of the one or more capsules comprises:
a flexible reservoir comprising:
an inlet removably connectable to the storing unit and configured to enable filling of the liquid mixture into the reservoir, and
an outlet configured to enable outflow of the liquid mixture from reservoir upon compression thereof; and
a pressure applicator configured to apply pressure to the flexible reservoir to press the reservoir.

15. The kit of claim 14, wherein the pressure applicator of each of the one or more capsules comprises:
a first arm;
a second arm; and
an arms-connector connecting the first arm and the second arm at one of their ends;
the reservoir is disposed between the first arm and the second arm and adapted to be pressed by the first arm and the second arm when the arms are pressed against each other;
the first arm and the second arm are made of elastic material and return to their initial state when the pressure thereon is released.

16. The kit of claim 15, wherein the first arm and the second arm of at least one of the one or more capsules comprise matching wave-like surfaces facing each other.

17. The kit of claim 15, wherein the first arm and the second arm of at least one of the one or more capsules comprises a first protrusion and a second protrusion, respectively, at free ends thereof, the first protrusion and the second protrusion are adapted to contact when the first arm and the second arm are pressed against each other.

18. The kit of claim 14, wherein each of the one or more capsules comprises a capsule identifier configured to store a capsule-related information.

* * * * *